(12) United States Patent
Nadakuduti et al.

(10) Patent No.: US 11,923,919 B1
(45) Date of Patent: Mar. 5, 2024

(54) EFFICIENT DETERMINATION OF RF EXPOSURE FOR MIMO TRANSMITTERS

(71) Applicant: QUALCOMM Incorporated, San Diego, CA (US)

(72) Inventors: Jagadish Nadakuduti, Bermuda Dunes, CA (US); Lin Lu, San Diego, CA (US); Paul Guckian, La Jolla, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/952,169

(22) Filed: Sep. 23, 2022

(51) Int. Cl.
  *H04B 7/0413* (2017.01)
  *H04B 17/382* (2015.01)
  *H04B 17/391* (2015.01)
(52) U.S. Cl.
  CPC ......... *H04B 7/0413* (2013.01); *H04B 17/382* (2015.01); *H04B 17/3911* (2015.01)
(58) Field of Classification Search
  CPC . H04B 7/0413; H04B 17/382; H04B 17/3911
  See application file for complete search history.

(56) References Cited

U.S. PATENT DOCUMENTS 11,432,249 B1 * 8/2022 Sambhwani ......... H04B 17/102

FOREIGN PATENT DOCUMENTS

WO  WO-2020010232 A1  1/2020

OTHER PUBLICATIONS

International Search Report and Written Opinion—PCT/US2023/072997—ISA/EPO—Nov. 11, 2023.
Xu B., et al., "Radio Frequency Exposure Compliance of Multiple Antennas for Cellular Equipment Based on Semidefinite Relaxation", IEEE Transactions on Electromagnetic Compatibility, IEEE Service Center, New York, NY, US, vol. 61, No. 2, Apr. 1, 2019, pp. 327-336, XP011707946, para [III.], [OIV.], [OV .A].

* cited by examiner

*Primary Examiner* — Rahel Guarino
(74) *Attorney, Agent, or Firm* — Loza & Loza, LLP

(57) ABSTRACT

Aspects of the present disclosure facilitate assessment of radio frequency (RF) exposure from a wireless device supporting multiple-input-multiple-output (MIMO) transmissions using multiple antennas. In certain aspects, MIMO RF exposure distributions for one or more MIMO transmissions are determined and stored in a memory. To assess RF exposure for a MIMO transmission, a processor may retrieve the corresponding MIMO RF exposure distributions from the memory, linearly combine the MIMO RF exposure distributions to obtain a combined MIMO RF exposure distribution, and assess RF exposure compliance based on the combined MIMO RF exposure distribution. In one example, the MIMO RF exposure distribution may include MIMO specific absorption rate (SAR) distributions.

30 Claims, 7 Drawing Sheets

EFFICIENT DETERMINATION OF RF EXPOSURE FOR MIMO TRANSMITTERS

BACKGROUND

Field

Aspects of the present disclosure relate generally to wireless devices, and more particularly, to assessing radio frequency (RF) exposure from a wireless device.

Background

Modern wireless devices (e.g., cellular phones) are generally required to limit a user's exposure to radio frequency (RF) radiation according to RF exposure limits set by domestic and international regulators. To ensure that a wireless device complies with an RF exposure limit, techniques have been developed to enable the wireless device to assess RF exposure from the wireless device in real time and adjust the transmission power of the wireless device accordingly to comply with the RF exposure limit.

SUMMARY

The following presents a simplified summary of one or more embodiments in order to provide a basic understanding of such embodiments. This summary is not an extensive overview of all contemplated embodiments, and is intended to neither identify key or critical elements of all embodiments nor delineate the scope of any or all embodiments. Its sole purpose is to present some concepts of one or more embodiments in a simplified form as a prelude to the more detailed description that is presented later.

A first aspect relates to a wireless device. The wireless device includes multiple transmit circuits, wherein the multiple transmit circuits are configured to transmit multiple radio frequency (RF) signals via multiple antennas, and a processor coupled to the transmit circuits. The processor is configured to combine multiple-input-multiple-output (MIMO) radio frequency (RF) exposure distributions into a combined MIMO RF exposure distribution, wherein the combined MIMO RF exposure distribution comprises a linear combination of the MIMO RF exposure distributions. The processor is also configured to determine maximum allowable power levels based on the combined MIMO RF exposure distribution, wherein each of the maximum allowable power levels corresponds to a respective one of the transmit circuits. The processor is further configured to, for each of the transmit circuits, set a respective power level limit based on the respective one of the maximum allowable power levels.

A second aspect relates to a method for operating a wireless device comprising multiple transmit circuits, wherein the transmit circuits are configured to transmit multiple radio frequency (RF) signals via multiple antennas. The method includes combining multiple-input-multiple-output (MIMO) radio frequency (RF) exposure distributions into a combined MIMO RF exposure distribution, wherein the combined MIMO RF exposure distribution comprises a linear combination of the MIMO RF exposure distributions. The method also includes determining maximum allowable power levels based on the combined MIMO RF exposure distribution, wherein each of the maximum allowable power levels corresponds to a respective one of the transmit circuits. The method further includes, for each of the transmit circuits, setting a respective power level limit based on the respective one of the maximum allowable power levels.

A third aspect relates to a computer readable medium. The computer readable memory includes instructions stored thereon for combining multiple-input-multiple-output (MIMO) radio frequency (RF) exposure distributions into a combined MIMO RF exposure distribution, wherein the combined MIMO RF exposure distribution comprises a linear combination of the MIMO RF exposure distributions. The computer readable memory also includes instructions for determining maximum allowable power levels based on the combined MIMO RF exposure distribution, wherein each of the maximum allowable power levels corresponds to a respective one of multiple transmit circuits, and, for each of the transmit circuits, setting a respective power level limit based on the respective one of the maximum allowable power levels.

To the accomplishment of the foregoing and related ends, the one or more embodiments include the features hereinafter fully described and particularly pointed out in the claims. The following description and the annexed drawings set forth in detail certain illustrative aspects of the one or more embodiments. These aspects are indicative, however, of but a few of the various ways in which the principles of various embodiments may be employed and the described embodiments are intended to include all such aspects and their equivalents.

DETAILED DESCRIPTION

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

Figure 1:
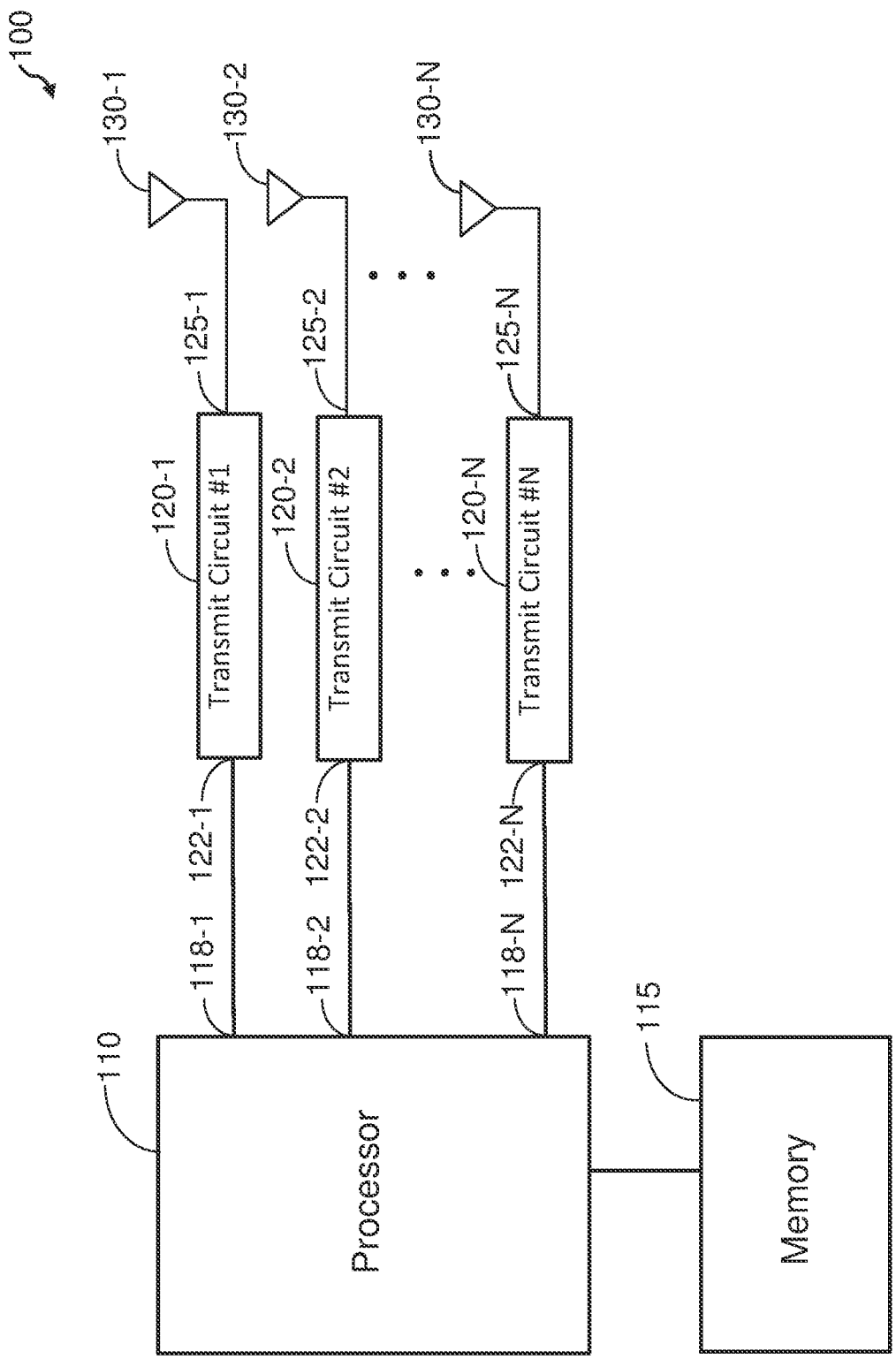
FIG. 1 shows an example of a wireless device in which aspects of the present disclosure may be implemented.

FIG. 1 shows an example of a wireless device 100 in which aspects of the present disclosure described herein may be implemented. The wireless device 100 may include a mobile wireless device (e.g., a cellular phone), a laptop, a wireless access point, an Internet of Things (IoT) device, a consumer premises equipment (CPE), a base station, or another wireless device.

The wireless device 100 includes a processor 110 and a memory 115. The memory 115 is coupled to the processor 110 and may store instructions that, when executed by the processor 110, cause the processor 110 to perform one or more of the operations described herein. The memory 115 may include random access memory (RAM), read only memory (ROM), flash memory, registers, or any combination thereof. The processor 110 may be implemented with a general-purpose processor, a digital signal processor (DSP), a baseband modem (also referred to as a baseband processor), an application specific integrated circuit (ASIC), a field programmable gate array (FPGA) or other programmable logic device (PLD), discrete gate logic, discrete hardware components, or any combination thereof configured to perform one or more of the operations described herein.

The wireless device 100 also includes multiple transmit circuits 120-1 to 120-N and multiple antennas 130-1 to 130-N. In the example shown in FIG. 1, each of the transmit circuits 120-1 to 120-N has a respective input 122-1 to 122-N and a respective output 125-1 to 125-N. For each of the transmit circuits 120-1 to 120-N, the respective input 122-1 to 122-N may be coupled to a respective output 118-1 to 118-N of the processor 110 and the respective output 125-1 to 125-N may be coupled to a respective one of the antennas 130-1 to 130-N. As discussed further below, each of the transmit circuits 120-1 to 120-N may be configured to output a respective one of multiple RF signals to the respective antenna 130-1 to 130-N via the respective output 125-1 to 125-N. The antennas 130-1 to 130-N may be arranged in a one-dimensional array, arranged in a two-dimensional array, arranged in a three-dimensional array, placed on different locations on the wireless device 100, etc. Each of the antennas 130-1 to 130-N may be implemented with a patch antenna or another type of antenna. The antennas 130-1 to 130-N may also be referred to as antenna elements or another term. Each of the transmit circuits 120-1 to 120-N may also be referred to as a transmitter, or another term.

In certain aspects, the transmit circuits 120-1 to 120-N are configured to transmit RF signals via the antennas 130-1 to 130-N using one or more wireless communication technologies, including, but not limited to, a third generation (3G) technology (e.g., CDMA), a fourth generation (4G) technology (also known as long term evolution (LTE)), a fifth generation (5G) technology, one or more technologies based on one or more IEEE 802.11 or 802.15 or 802.16 protocols (e.g., IEEE 802.11ac, IEEE 802.11n. IEEE 802.11ad. IEEE 802.11ax, IEEE 802.11ay, etc.), a Bluetooth technology, and/or one or more other technologies.

In certain aspects, the wireless device 100 transmits data and/or control information to another wireless device (not shown) using multiple-input-multiple-output (MIMO) transmission (e.g., to increase data throughput between the wireless device 100 and the other wireless device). In these aspects, the transmit circuits 120-1 to 120-N may simultaneously transmit multiple RF signals via the antennas 130-1 to 130-N. For example, the transmit circuits 120-1 to 120-N may transmit the multiple RF signals at the same transmitting frequency (e.g., the multiple RF signals may have the same center frequency, same subcarriers, etc.). As used herein, a "transmitting frequency" may refer to a center frequency (e.g., of a frequency band), a subcarrier, a group of subcarriers, a frequency band, or the like. For MIMO transmission, the wireless device 100 may employ spatial multiplexing, diversity coding, precoding, beamforming, multi-user MIMO, etc. For the example of MIMO transmission, the transmit circuits 120-1 to 120-N may transmit multiple RF signals (e.g., coherent RF signals) having the same transmitting frequency via the antennas 130-1 to 130-N(e.g., using the same radio access technology (RAT)), in which each of the transmit circuits 120-1 to 120-N transmits the respective one of the RF signals via the respective one of the antennas 130-1 to 130-N. MIMO may be used, for example, to provide spatial diversity and/or increased transmit power. It is to be appreciated that a MIMO transmission may be transmitted using a subset of the transmit circuits 120-1 to 120-N and a subset of the antennas 130-1 to 130-N instead of all of the transmit circuits 120-1 to 120-N and all of the antennas 130-1 to 130-N in some use cases.

To transmit data and/or control information, the processor 110 may process the data and/or control information into one or more signals (e.g., one or more baseband signals or intermediate-frequency (IF) signals). The processing performed by the processor 110 may include coding the data and/or control information, and modulating the coded data and/or control information (e.g., using any one of a variety of different modulation schemes, including BPSK, QPSK, QAM, etc.). For the example of MIMO, the processor 110 may also perform spatial multiplexing, diversity coding, precoding, etc. The processor 110 outputs the one or more signals to one or more of the transmit circuits 120-1 to 120-N. The one or more transmit circuits 120-1 to 120-N are configured to convert the one or more signals from the processor 110 into one or more RF signals, and output the one or more RF signals to one or more of the antennas 130-1 to 130-N for transmission. For the example of MIMO, the processor 110 may output multiple signals (also referred to as streams) to the transmit circuits 120-1 to 120-N, in which each of the transmit circuits 120-1 to 120-N receives a respective one of the signals. Each transmit circuits 120-1 to 120-N may process the respective one of the signals into a respective RF signal and output the respective RF signal to the respective one of the antennas 130-1 to 130-N for transmission. The processing performed by each of the transmit circuits 120-1 to 120-N may include filtering, frequency upconverting, power amplifying, and/or any combination thereof.

Figure 2:
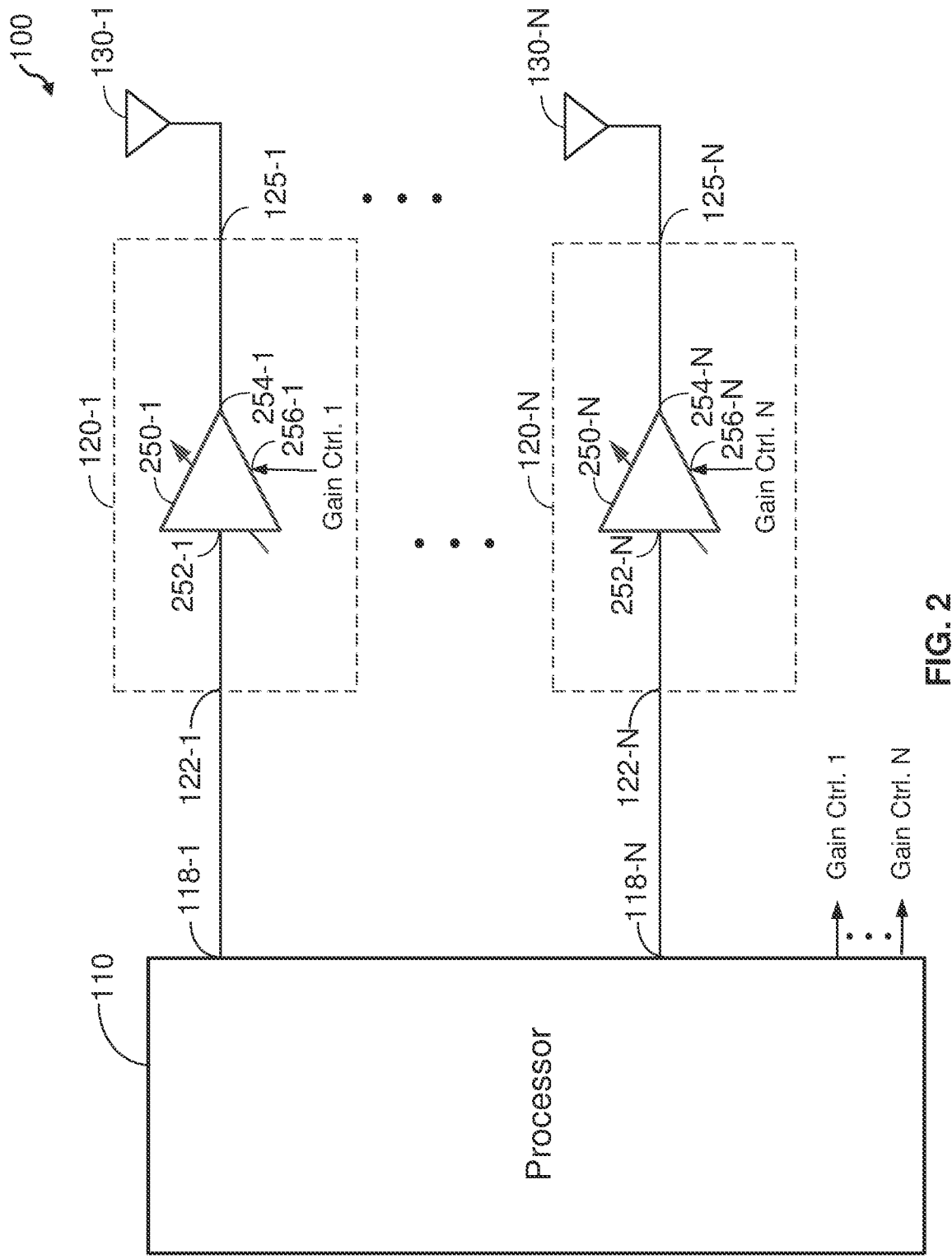
FIG. 2 shows an example of the wireless device including transmit circuits where each of the transmit circuits includes a respective amplifier according to certain aspects of the present disclosure.

In certain aspects, the processor 110 may set the transmission power level of each of the transmit circuits 120-1 to 120-N using any one of a variety of techniques. One example is illustrated in FIG. 2, in which each of the transmit circuits 120-1 to 120-N includes a respective amplifier 250-1 to 250-N. The input 252-1 to 252-N of each amplifier 250-1 to 250-N is coupled to the respective input 122-1 to 122-N and the output 254-1 to 254-N of each amplifier 250-1 to 250-N is coupled to the respective output 125-1 to 125-N. Each amplifier 250-1 to 250-N may include a respective power amplifier, a variable gain amplifier, or another type of amplifier.

It is to be appreciated that each of the transmit circuits 120-1 to 120-N may include one or more additional components not shown explicitly in FIG. 2. The one or more additional components in each of the transmit circuits 120-1 to 120-N may include a mixer (e.g., for frequency conversion), an additional amplifier, a filter, or any combination thereof. In certain aspects, the one or more additional elements in each of the transmit circuits 120- to 120-N may be coupled with the respective amplifier 250-1 to 250-N in a chain (e.g., RF chain), but is not limited to this example.

Each amplifier 250-1 to 250-N may have a respective control input 256-1 to 256-N, as shown in the example in FIG. 2. In this example, each amplifier 250-1 to 250-N is configured to receive the respective signal (e.g., respective RF signal) at the respective input 252-1 to 252-N, amplify the respective signal by a respective gain, and output the respective amplified signal at the respective output 254-1 to 254-N. Each amplifier 250-1 to 250-N is also configured to receive a respective gain control signal (labeled "Gain Ctrl. 1" to "Gain Ctrl. N") at the respective control input 256-1 to 256-N and set the respective gain based on the respective gain control signal.

In the example in FIG. 2, the processor 110 is coupled to the control inputs 256-1 to 256-N of the amplifiers 250-1 to 250-N. In this example, the processor 110 may set the output transmission power level of each of the transmit circuits 120-1 to 120-N by setting the gain of the respective amplifier 250-1 to 250-N accordingly using the respective gain control signal. For example, the processor 110 may set the transmission power level of one of the transmit circuits 120-1 to 120-N to a higher transmission power level by increasing the gain of the respective amplifier 250-1 to 250-N.

In certain aspects, the processor 110 may set the transmission power level for each of the antennas 130-1 to 130-N by setting the gain of the respective amplifier 250-1 to 250-N accordingly. In one example, the processor 110 may individually set the transmission power levels for the antennas 130-1 to 130-N by setting the gains of the respective amplifiers 250-1 to 250-N individually using the respective gain control signals. It is to be appreciated that the present disclosure is not limited to this example, and that the processor 110 may employ other techniques to set the transmission power levels of the antennas 130-1 to 130-N. For example, in some implementations, the gains of the amplifiers 250-1 to 250-N may be controlled by the same gain control signal. In these implementations, the processor 110 may increase or decrease the gains of the amplifiers 250-1 to 250-N in unison.

It is to be appreciated that aspects of the present disclosure are not limited to the example shown in FIG. 2, and that the processor 110 may use other techniques to control the transmission power level of each of the transmit circuits 120-1 to 120-N.

In certain aspects, the processor 110 may set the transmission power levels for the antennas 130-1 to 130-N using an open power control loop and/or a closed power control loop. For the example of an open power control loop, the wireless device 100 may receive a pilot signal from another wireless device (not shown) via a receiver (not shown). In this example, the processor 110 estimates channel conditions between the wireless device 100 and the other wireless device based on the received pilot signal, and sets the transmission power levels for the antennas 130-1 to 130-N based on the estimated channel conditions. For the example of a closed power control loop, the wireless device 100 receives a feedback signal from the other wireless device via a receiver (not shown), in which the feedback signal indicates channel conditions between the wireless device 100 and the other wireless device. In this example, the processor 110 sets the transmission power levels for the antennas 130-1 to 130-N based on the indicated channel conditions.

The processor 110 may also set the transmission power levels for the antennas 130-1 to 130-N based on data rate. For example, the processor 110 may increase (i.e., boost) the transmission power levels to transmit a short data burst.

Further, the processor 110 may limit the transmission power levels that can be set for the antennas 130-1 to 130-N to keep a user's RF exposure from the wireless device 100 within an RF exposure limit set by a regulator, as discussed further below. In this case, the transmission power levels for the antennas 130-1 to 130-N are constrained by the RF exposure limit (i.e., the transmission power levels cannot be set to levels exceeding the RF exposure limit).

For cases where the wireless device 100 (e.g., cellular phone) is used in close proximity to a user, the wireless device 100 may be required to limit the user's exposure to RF radiation according to an exposure limit set by domestic and international regulators. RF exposure may be expressed in terms of a specific absorption rate (SAR), which measures energy absorption by human tissue per unit mass and may have units of watts per kilogram (W/kg). RF exposure may also be expressed in terms of power density (PD), which measures energy absorption per unit area and may have units of mW/cm².

For example, SAR may be determined at a location based on the electric field induced by an RF transmission of the wireless device as follows:

$$SAR = \sigma \frac{|E|^2}{\rho} \qquad (1)$$

where E is the electric field (E-field) at the location induced by the RF transmission, σ is electric conductivity, and ρ is the mass density of human tissue or a model of human tissue. For the case of a MIMO transmission using multiple antennas (e.g., antennas 130-1 to 130-N), the electric field may be the summation of the electric fields induced by the RF transmissions from the multiple antennas.

To assess RF exposure from transmissions of the wireless device 100, the wireless device 100 may include multiple SAR distributions stored in the memory 115. Each of the SAR distributions may correspond to a respective one of multiple transmit scenarios supported by the wireless device 100. The transmit scenarios may correspond to various combinations of the antennas 130-1 to 130-N, frequency bands, channels and/or body positions, as discussed further below.

The SAR distribution for each transmit scenario may be generated based on measurements (e.g., E-field measurements) performed in a test laboratory using a model of a human body. After the SAR distributions are generated, the SAR distributions are stored in the memory 115 to allow the processor 110 to assess RF exposure in real time, as discussed further below. Each SAR distribution may include a set of SAR values. For example, the SAR distribution may include two SAR values, 5 or more SAR values, tens of SAR values, or even hundreds or thousands of SAR values. The SAR values in the distribution may correspond to variations in SAR for a transmit scenario. In some examples, the SAR distribution is representative of a map such that each SAR value in the distribution corresponds to a different spatial location (e.g., on the model of the human body) or portion of user tissue. In certain aspects, the SAR value for each location in a SAR distribution may be determined from an E-field measurement at the location (e.g., based on equation (1)). For the example where a SAR distribution includes a set of SAR values, the number of SAR values in the SAR distribution may depend, for example, on a tradeoff between spatial resolution of the SAR distribution and computational load. For example, a larger number of SAR values may be used to increase resolution of the SAR distribution while a lower number of SAR values may be used decrease the computational load needed to process the SAR distribution and/or the amount of memory space needed to store the SAR distribution. In some examples, the values in the SAR distribution are representative of exposure(s) at a given time.

The SAR values in each SAR distribution correspond to a particular transmission power level (e.g., the transmission power level at which the E-fields for the SAR values were measured in the test laboratory). Since SAR scales with transmission power level, the processor 110 may scale a SAR distribution for any transmission power level by multiplying each SAR value in the SAR distribution by the following transmission power scaler:

$$Tx_c/Tx_{SAR} \quad (2)$$

where $Tx_c$ is a current transmission power level for the respective transmit scenario, and $TX_{SAR}$ is the transmission power level corresponding to the SAR values in the stored SAR distribution (e.g., the transmission power level at which the E-fields for the SAR values were measured in the test laboratory). In the discussion below, the $Tx_{SAR}$ is referred to as the reference transmission power level. Thus, once the SAR distribution is determined at the reference transmission power level, the SAR distribution may be determined for another transmission power level by scaling the SAR distribution by the transmission power scaler in equation (2).

As discussed above, the wireless device 100 may support multiple transmit scenarios. In certain aspects, the transmit scenarios may be specified by a set of parameters. The set of parameters may include one or more of the following: an antenna parameter indicating one or more antennas used for transmission (i.e., active antennas), a frequency band parameter indicating one or more frequency bands used for transmission (i.e., active frequency bands), a channel parameter indicating one or more channels used for transmission (i.e., active channels), a body position parameter indicating the location of the wireless device 100 relative to the user's body location (head, trunk, away from the body, etc.), distance of human tissue from the device, and/or other parameters. In cases where the wireless device 100 supports a large number of transmit scenarios, it may be very time-consuming and expensive to perform measurements for each transmit scenario in a test setting (e.g., test laboratory). To reduce test time, measurements may be performed for a subset of the transmit scenarios to generate SAR distributions for the subset of transmit scenarios. In this example, the SAR distribution for each of the remaining transmit scenarios may be generated by combining two or more of the SAR distributions for the subset of transmit scenarios, as discussed further below.

For example, SAR measurements may be performed for each one of the antennas 130-1 to 130-N to generate a SAR distribution for each one of the antennas 130-1 to 130-N. In this example, a SAR distribution for a transmit scenario in which two or more of the antennas 130-1 to 130-N are active may be generated by combining the SAR distributions for the two or more active antennas.

In certain aspects, the SAR distribution for a transmit scenario may be generated by combining two or more SAR distributions. The SAR distributions may correspond to different antennas, different frequency bands, different transmitters, any combination thereof, etc. For the case in which different transmission power levels are used for the SAR distributions, each of the SAR distributions may be scaled by the respective transmission power scaler before combining the SAR distributions into a combined SAR distribution (also referred to as total SAR distribution) for the transmit scenario. The combined SAR distribution may be given by the following:

$$SAR_{combined} = \sum_{k=1}^{m} \frac{T_{x_k}}{T_{x_{SARk}}} \cdot SAR_k \quad (3)$$

where $SAR_{combined}$ is the combined SAR distribution for the transmit scenario, k is an index for the SAR distributions, $SAR_k$ is the $k^{th}$ SAR distribution, $Tx_k$ is the current transmission power level for the $k^{th}$ SAR distribution, $Tx_{SARk}$ is the reference transmission power level corresponding to the $k^{th}$ SAR distribution, and m is the number of SAR distributions. The $k^{th}$ SAR distribution may be obtained by measuring the SAR distribution with the wireless device 100 transmitting at $Tx_{SARk}$. Thus, the combined SAR distribution for the transmit scenario is the sum of the individual SAR distributions, which is a linear operation. Each of the SAR distributions is scaled by the respective transmission power scaler (i.e., the ratio $Tx_k/Tx_{SARk}$) before the SAR distributions are combined. It is to be appreciated that the number of SAR distributions (i.e., m) may be less than, equal to, or greater than the number of antennas 130-1 to 130-N. For example, the number of SAR distributions may be less than the number of antennas 130-1 to 130-N when a subset of the antennas 130-1 to 130-N are used (e.g., for a non-MIMO transmission such as single-input-single-output (SISO) transmission). In another example, the number of SAR distributions may be greater than the number of antennas 130-1 to 130-N when multiple RF signals (e.g., in different frequency bands) are transmitted from the same antenna.

In certain aspects, a SAR distribution may be normalized with respect to a SAR limit by dividing each SAR value in the SAR distribution by the SAR limit. In this case, a normalized SAR value exceeds the SAR limit when the normalized SAR value is greater than one, and is below the SAR limit when the normalized SAR value is less than one. In these aspects, each of the SAR distributions stored in the memory 115 may be normalized with respect to a SAR limit. In one example, the combined SAR distribution given in equation (3) may be rewritten as follows:

$$SAR_{norm\_combined} = \sum_{k=1}^{m} \frac{T_{x_k}}{T_{x_{SARk}}} \cdot SAR_{norm\_k} \quad (4)$$

where $SAR_{norm\_combined}$ is the normalized combined SAR distribution, and $SAR_{norm\_k}$ is the $k^{th}$ normalized SAR distribution. In certain aspects, the SAR limit may be a regulatory SAR limit set by a regulatory body (e.g., the Federal Communications Commission (FCC) or another regulatory body) to limit the RF exposure of a user. In certain aspects, the SAR limit may be set to a value below the regulatory SAR limit, which may be referred to as a SAR design target. For example, a SAR design target may be lower than the regulatory SAR limit to account for device uncertainties and/or to budget enough SAR margin to comply with total RF exposure in simultaneous transmission scenarios with other transmitters. As used herein, a regulatory exposure limit refers to an exposure limit set by a regulatory body (e.g., FCC).

In certain aspects, a reference transmission power level corresponding to a SAR design target (referred to as a maximum time-averaged power limit $P_{limit}$) may be used for each SAR distribution. For example, the maximum time-averaged power limit $P_{limit}$ for the $k^{th}$ SAR distribution may be given by:

$$P_{limitk} = Tx_{SARk} * SAR \text{ design target}/\max(SAR_k) \tag{5}$$

where $\max(SAR_k)$ is the maximum value (i.e., the largest SAR value) in the $k^{th}$ SAR distribution. In this example, the time-averaged SAR can be limited to less than or equal to the SAR design target by limiting the time-averaged transmission power for the $k^{th}$ SAR distribution to less than or equal to $P_{limitk}$. $P_{limitk}$ may vary with technology, operating frequency band, transmitting antenna, and/or device position relative to the human body (referred to as device state index). In these aspects, equation (4) above may be modified to the following:

$$SAR_{norm\_combined} = \sum_{k=1}^{m} \frac{Tx_k}{P_{limitk}} \cdot SAR_{norm\_k} \tag{6}$$

where $SAR_{norm\_combined}$ is the normalized combined SAR distribution, $P_{limitk}$ is the $P_{limit}$ corresponding to the $k^{th}$ SAR distribution, and $SAR_{norm\_k}$ is the $k^{th}$ SAR distribution measured at a transmission power level of $P_{limitk}$ (i.e., maximum value in $k^{th}$ SAR distribution corresponding to the SAR design target) and normalized to the SAR design target. In other words, $SAR_{norm\_k}$ represents the $k^{th}$ SAR distribution normalized with respect to its maximum value, which is obtained by dividing each value in the $k^t h$ SAR by the maximum value in the $k^{th}$ SAR distribution resulting in each value in $SAR_{norm\_k}$ being less than or equal to one. Thus, in the present disclosure, a normalized SAR distribution may refer to a SAR distribution normalized with respect to a SAR limit (e.g., a regulatory SAR limit or a SAR design target) and/or a SAR distribution normalized with respect to the maximum value in the SAR distribution.

Figure 3:
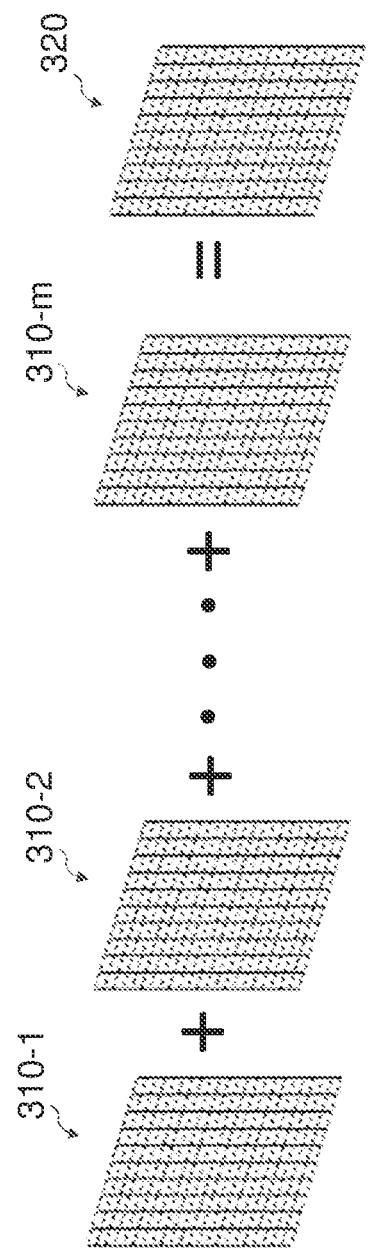
FIG. 3 shows a visual representation of a combined specific absorption rate (SAR) distribution according to certain aspects of the present disclosure.

FIG. 3 shows a visual representation of multiple SAR distributions 310-1 to 310-$m$ that are combined to obtain a combined SAR distribution 320. Each of the SAR distributions 310-1 to 310-$m$ may be normalized with respect to a SAR limit (e.g., a regulatory SAR limit or a SAR design target). The SAR distributions 310-1 to 310-$m$ may be aligned spatially in which SAR values in the same location are combined to obtain the combined SAR distribution. Although each of the SAR distributions 310-1 to 310-$m$ and 320 is depicted as a two-dimensional distribution in FIG. 3, it is to be appreciated that the present disclosure is not limited to this example.

In certain aspects, the combined SAR distribution complies with an RF exposure limit when the peak SAR value (i.e., maximum SAR value) in the combined SAR distribution 320 is equal to or less than an RF exposure limit (e.g., a regulatory SAR limit, a SAR design target, etc.). For the example in which the SAR distributions 310-1 to 310-$m$ are normalized (e.g., with respect to a regulatory SAR limit, a SAR design target, etc.), the RF exposure limit may be a normalized RF exposure limit of one. When time-averaging over a time window is used to assess RF exposure compliance, the peak SAR value in the combined SAR distribution 320 may temporarily exceed the RF exposure limit as long as the time-average of the peak SAR value over the time window does not exceed the RF exposure limit.

In the case of MIMO, in which multiple antennas (e.g., all of the antennas 130-1 to 130-N or a subset of the antennas 130-1 to 130-N) transmit simultaneously at the same transmitting frequency (e.g., center frequency, subcarrier, etc.), the combined SAR distribution is obtained by summing the square roots of the individual SAR distributions and computing the square of the sum. In this case, the combined SAR distribution may be given by the following:

$$SAR_{norm\_combined} = \left[\sum_{k=1}^{m} \sqrt{\frac{Tx_k}{P_{limitk}} \cdot SAR_{norm\_k}}\right]^2 \tag{7}$$

where $SAR_{norm\_k}$ for the $k^{th}$ SAR distribution may be normalized with respect to a SAR limit (e.g., a regulatory SAR limit or a SAR design target). In this example, each of the SAR distributions may correspond to a respective one of the multiple antennas used for MIMO transmission (e.g., respective one of the antennas 130-1 to 130-N), and each of the SAR distributions is scaled by the respective transmission power scaler (i.e., the ratio $Tx_k/P_{limitk}$). In equation (7), the square roots of the SAR distributions for the individual antennas used for MIMO transmission are computed. This is done to sum the electric fields of the SAR distributions for the individual antennas that are used for the MIMO transmission (note that a SAR value is proportional to the square of the electric field in equation (1)). The sum of the square roots is then squared to obtain the combined SAR distribution for the MIMO transmission.

In certain aspects, the transmit circuits 120-1 to 120-N may simultaneously transmit signals using both MIMO transmission and non-MIMO transmission (e.g., SISO transmission). In these aspects, the combined SAR distribution may be given by the following:

$$SAR_{norm\_combined} = \left[\sum_{k=1}^{m} \sqrt{\frac{Tx_k}{P_{limitk}} \cdot SAR_{norm\_k}}\right]^2 + \sum_{k=m+1}^{d} \frac{Tx_k}{P_{limitk}} \cdot SAR_{norm\_k} \tag{8}$$

where d is the total number of SAR distributions, the SAR distributions k=1 to k=m correspond to the MIMO transmission, and the SAR distributions k=m+1 to k=d correspond to the non-MIMO transmission. As shown in equation (8), the square roots of the SAR distributions for the MIMO transmission are computed. As discussed above, this is done to sum the electric fields of the SAR distributions for the individual antennas that are part of the MIMO transmission (note that a SAR value is proportional to the square of the electric field in equation (1)). The sum of the square roots is then squared to obtain the combined SAR distribution for the MIMO transmission. In certain aspects, the MIMO transmission may include transmission of multiple RF signals (e.g., coherent RF signals) having the same transmitting frequency (e.g., using the same RAT).

For the non-MIMO transmission, the corresponding SAR distributions (i.e., SAR distributions k=m+1 to k=d) are scaled by the respective transmission power scaler (i.e., ratio $Tx_k/P_{limitk}$) and summed without the need for square roots of the SAR distributions as the antennas for these SAR distributions operate at different transmission frequency. The non-MIMO transmission may include transmission of two or more RF signals at different transmitting frequencies (e.g., via different antennas 130-1 to 130-N). The non-MIMO transmission may also include transmission of two or more RF signals having the same or similar transmitting frequency using different RATs (e.g., different RAT for each of the RF signals). The RATs may include, for example, IEEE 802.11 or 802.15 or 802.16 protocols (e.g., IEEE 802.11ac, IEEE 802.11n, IEEE 802.11ad, IEEE 802.11ax, IEEE 802.11ay, etc.), a Bluetooth technology, etc.

In certain aspects, multiple subsets of antennas (e.g., subsets of antennas 130-1 to 130-N) may be used for multiple MIMO transmissions. In these aspects, equation (8) can be generalized for multiple subsets of the antennas used for multiple MIMO transmissions. For example, a first subset of antennas corresponding to SAR distributions k=1 to k=m1 may be used for a WWAN MIMO transmission, a second subset of the antennas corresponding to SAR distributions k=m1+1 to k=m2 may be used for a WLAN MIMO transmission, and a third subset of the antennas corresponding to SAR distributions k=m2+1 to d may be used for a non-MIMO transmission. In these aspects, equation (8) can be generalized as shown below:

$$SAR_{norm\_combined} = \left[\sum_{k=1}^{m1}\sqrt{\frac{T_{x_k}}{P_{limitk}} \cdot SAR_{norm_k}}\right]^2 + \left[\sum_{k=m1+1}^{m2}\sqrt{\frac{T_{x_k}}{P_{limitk}} \cdot SAR_{norm_k}}\right]^2 + \ldots + \left[\sum_{k=m_{s-2}+1}^{m_{s-1}}\sqrt{\frac{T_{x_k}}{P_{limitk}} \cdot SAR_{norm\_k}}\right]^2 + \left[\sum_{k=m_{s-1}+1}^{m_s}\sqrt{\frac{T_{x_k}}{P_{limitk}} \cdot SAR_{norm\_k}}\right]^2 + \sum_{k=m_s+1}^{d}\frac{T_{x_k}}{P_{limitk}} \cdot SAR_{norm\_k} \quad (9)$$

where s subsets of antennas are used for MIMO transmissions. SAR distributions k=1 to k=m1 correspond to the first one of the s subsets, SAR distributions k=m1+1 to k=m2 correspond to the second one of the s subsets, and so forth. The remaining SAR distributions k=ms+1 to k=d correspond to the non-MIMO transmission. Note that ($P_{limitk}$, $SAR_{norm\_k}$) for $k^{th}$ antenna in equation (9) is also frequency dependent.

In equation (9), all d antennas may be divided into MIMO antennas or non-MIMO antennas, and each of these antennas may correspond to one transmitting frequency. However, it is possible to simultaneously transmit multiple frequencies from one antenna, and one antenna may be used for both MIMO transmission as well as non-MIMO transmission simultaneously at different frequencies. In that case, the SAR distribution for each of the multiple frequencies transmitted from a given antenna may be added to above equation (9). For example, if k=1 to m1 antennas are used in MIMO transmission for WLAN 2.4 GHz and the same k=1 to m1 antennas are also used in MIMO transmission for WLAN 5 GHz, then the k=1 to m1 antennas in equation (9) may be repeated twice, where one set of ($Tx_k$, $P_{limitk}$, $SAR_{norm\_k}$) for the k=1 to m1 antennas corresponds to WLAN 2.4 GHz SAR distributions and a second set of {$Tx_k$, $P_{limitk}$, $SAR_{norm\_k}$} for the k=1 to m1 antennas corresponds to WLAN 5 GHz SAR distributions. Similarly, an antenna can be used for MIMO transmission as well as non-MIMO transmission simultaneously at different frequencies. In that case, this antenna should be part of MIMO subset (i.e., part of square root term involving other MIMO antennas of that subset) as well as part of non-MIMO contribution (i.e., last term in equation (9)). For the case of multiple MIMO transmissions with no non-MIMO transmission, the last term in equation (9) may be omitted.

Thus, equation (7) describes combining SAR distributions for a MIMO transmission, equation (8) describes combining SAR distributions for a MIMO transmission and multiple SISO transmissions, and equation (9) describes combining SAR distributions for multiple MIMO transmissions and multiple SISO. For a given MIMO transmission (e.g., equation (7), the MIMO term in equation (8), or one of the s subsets in equation (9)), the operation for combining SAR distributions for the MIMO transmission is a non-linear operation that includes computing the square roots of the scaled SAR distributions and computing the square of the sum. Because the operation is non-linear, the operation is computationally intensive for the processor 110 to perform. In some cases, the processor 110 may need to perform the above operation frequently to assess real-time RF exposure. In addition, for multiple MIMO transmissions, the processor 110 may need to perform the above operation for each of the s subsets. In these cases, the above operation can consume a large portion of the processor's 110 computational resources and significantly increase the processor's 110 power consumption. In some cases, the above operation may be too computationally intensive for the processor 110 to perform in real time.

To address the above problem, aspects of the present disclosure provide MIMO SAR distributions for a MIMO transmission that can be linearly combined in a linear operation, which significantly reduces the computational load on the processor 110 compared with the above non-linear operation. The MIMO SAR distributions may be determined for each MIMO transmitting antenna in a one-time computation, stored in the memory 115, and later retrieved from the memory 115 to assess RF exposure for the MIMO transmission in real time, as discussed further below. Note that aspects of the present disclosure are described for one MIMO transmission. The MIMO transmission may correspond to one of the s subsets of MIMO antennas. For multiple MIMO transmissions, a similar operation can be performed for each subset of MIMO antennas if the wireless device 100 supports multiple MIMO transmissions (for example, WWAN MIMO transmission versus WLAN MIMO transmission, or WLAN 2.4 GHz MIMO transmission versus WLAN 5 GHz MIMO transmission).

In certain aspects, the wireless device 100 supports a MIMO transmit scenario in which the wireless device 100 simultaneously transmits RF signals at the same frequency using multiple transmitting antennas. In these aspects, a normalized MIMO SAR distribution for each of m transmitting antennas (i.e., active antennas) for the MIMO transmit scenario for a given operating frequency band may be determined as follows:

$$SAR_{norm\_MIMO\_k} = SAR_{norm\_k} + \sum_{\substack{i=1 \\ i \neq k}}^{m} \sqrt{SAR_{norm\_k} SAR_{norm\_i}} \quad (10)$$

where $SAR_{norm\_MIMO\_k}$ is the normalized MIMO SAR distribution for the $k^{th}$ antenna among the m transmitting antennas in the MIMO transmit scenario. The MIMO SAR distribution for the $k^{th}$ antenna shown in equation (10) includes a first component and a second component. The first component is the normalized SAR distribution for the $k^{th}$ antenna discussed above in equations (7), (8), and (9), and the second component accounts for the correlation between the $k^{th}$ antenna and each one of the other m antennas used for the MIMO transmission. In this example, the second component comprises a sum of multiple components, in which each of the multiple components comprises a square root of a product of the SAR distribution for the $k^{th}$ antenna and the SAR distribution for a respective one of the other m antennas. It should be noted that in equation (10), normalized SAR distributions for all antennas (i.e., $SAR_{norm\_k}$ and $SAR_{norm\_k}$) may have a maximum value of one. However, the maximum value of normalized MIMO SAR distribution for the $k^{th}$ antenna (i.e., $SAR_{norm\_MIMO\_k}$) can be greater than one.

The normalized MIMO SAR distribution for the $k^{th}$ antenna in equation (10) corresponds to all m antennas transmitting in the MIMO transmission. However, it is to be appreciated that less than m transmitting antennas may be used for a MIMO transmission. For example, if there are only two antennas active in a MIMO transmission, say antenna k and antenna i, then equation (10) may be re-computed for this two-antenna MIMO transmission, in which $SAR_{norm\_MIMO\_k} = SAR_{norm\_k} + \sqrt{SAR_{norm\_k} SAR_{norm\_i}}$ and $SAR_{norm\_MIMO\_i} = SAR_{norm\_i} + \sqrt{SAR_{norm\_i} SAR_{norm\_k}}$. Similarly, equation (10) can be computed on a one-time basis for any given set of active antennas involved in a MIMO transmission.

The normalized MIMO SAR distribution for each of the m transmitting antennas for the m-antenna MIMO transmit scenario can be computed one-time based on equation (10) and stored in the memory 115 for later use. For example, a device (e.g., a computer) external to the wireless device 100 may compute the normalized MIMO SAR distributions, and the normalized MIMO SAR distributions may then be loaded into the memory 115 (e.g., via a wired link or a wireless link) for later use. In another example, the processor 110 may compute the normalized MIMO SAR distributions and store the normalized MIMO SAR distributions in the memory 115 for later use.

After the normalized MIMO SAR distributions are stored in the memory 115, the processor 110 can retrieve the normalized MIMO SAR distributions for the m transmitting antennas from the memory 115 to assess RF exposure in real time for a MIMO transmission scenario without having to recompute the normalized MIMO SAR distributions in real time. The normalized MIMO SAR distributions may be computed one-time by the processor 110 or a device (e.g., computer) external to the wireless device 100, and stored in the memory 115 for later use. Similarly, in the case of devices supporting multiple MIMO transmissions, equation (10) can be used to determine normalized MIMO SAR distributions for each of the MIMO subset antennas and operating frequency band combinations. For example, if antennas k=1 to k=m1 are used for both WLAN 2.4 GHz MIMO transmission and WLAN 5 GHz MIMO transmission, then equation (10) may be used to compute the corresponding $SAR_{norm\_k}$ distributions at 2.4 GHz band for the WLAN 2.4 GHz MIMO transmission involving k=1 to m1 antennas, and equation (10) may also be used to compute the corresponding $SAR_{norm\_k}$ distributions at 5 GHz band for WLAN 5 GHz MIMO transmission involving k=1 to k=m1 antennas.

The combined normalized SAR distribution for the MIMO transmit scenario is computed by scaling the individual normalized MIMO SAR distributions for the transmitting antennas by the respective transmission power scalers, and summing the scaled MIMO SAR distributions as follows:

$$SAR_{norm\_MIMO\_combined} = \sum_{k=1}^{m} \frac{T_{x_k}}{P_{limitk}} \cdot SAR_{norm\_MIMO\_k} \quad (11)$$

where $SAR_{norm\_MIMO\_combined}$ is the combined normalized MIMO SAR distribution, k is an index for the normalized MIMO SAR distributions, $SAR_{norm\_MIMO\_k}$ is the normalized MIMO SAR distribution for the $k^{th}$ transmitting antenna determined using equation (10) for a given operating frequency band, $Tx_k$ is the current transmission power level for the $k^{th}$ transmitting antenna. $P_{limitk}$ is the $P_{limit}$ level for the $k^{th}$ transmitting antenna for a given operating frequency band, and m is the number of antennas used for a given MIMO transmission. The transmission power level for each of the transmitting antennas (e.g., antennas 130-1 to 130-N or a subset of antennas 130-1 to 130-N) may correspond to the output transmission power level of the respective transmit circuit (e.g., respective one of the transmit circuits 120-1 to 120-N). As shown in equation (11), the combined normalized MIMO SAR distribution is a linear combination of the normalized MIMO SAR distributions for the individual antennas, in which each of the normalized MIMO SAR distributions is scaled by the respective transmission power scaler (i.e., the ratio $Tx_k/P_{limitk}$). Therefore, equation (11) simplifies the non-linear operation of any one of equations (7), (8), and (9) by using one-time computation of equation (10). For the case in which multiple antenna subsets are used for multiple MIMO transmissions, equation (11) may be modified to compute a combined normalized MIMO SAR distribution for the multiple MIMO transmissions (i.e., all the antenna subsets) as follows:

$$SAR_{norm\_combined} = \quad (12)$$
$$\sum_{k=1}^{m1} \frac{T_{x_k}}{P_{limitk}} \cdot SAR_{norm\_MIMO\_k} + \sum_{k=m1+1}^{m2} \frac{T_{x_k}}{P_{limitk}} \cdot SAR_{norm\_MIMO\_k} +$$
$$\ldots + \sum_{k=m_{s-2}+1}^{m_{s-1}} \frac{T_{x_k}}{P_{limitk}} \cdot SAR_{norm\_MIMO\_k} +$$
$$\sum_{k=m_{s-1}+1}^{m_s} \frac{T_{x_k}}{P_{limitk}} \cdot SAR_{norm\_MIMO\_k}$$

where s subsets of antennas are used for the MIMO transmissions, MIMO SAR distributions k=1 to k=m1 correspond to the first one of the s subsets, MIMO SAR distributions k=m1+1 to k=m2 correspond to the second one of the s subsets, and so forth.

For a case where there is also a non-MIMO transmission (e.g., SISO transmission), the non-MIMO transmission term in equation (9) (i.e., the rightmost term in equation (9)) may be added to equation (11) or (12) to account for the SAR contribution from the non-MIMO transmission. For example, the non-MIMO transmission term may be added to equation (11) for the case of simultaneous MIMO transmission and non-MIMO transmission as follows:

$$SAR_{norm\_combined} = \quad (13)$$
$$\sum_{k=1}^{m} \frac{T_{x_k}}{P_{limitk}} \cdot SAR_{norm\_MIMO\_k} + \sum_{k=m+1}^{d} \frac{T_{x_k}}{P_{limitk}} SAR_{norm\_k}$$

where $SAR_{norm\_combined}$ is the combined normalized SAR distribution, antennas k=1 to k=m are used for the MIMO transmission, and antennas k=m+1 to k=d are used for the non-MIMO transmission. The SAR distributions for the non-MIMO transmission (e.g., SAR distributions for k=m+1 to k=d) may also be referred to as non-MIMO SAR distributions. In this example, the combined normalized SAR distribution is a combination of the combined normalized MIMO SAR distribution and the combined normalized non-MIMO SAR distribution. The non-MIMO term may also be added to equation (12) in a similar manner for the case of simultaneous MIMO transmissions and non-MIMO transmission, in which the wireless device 100 may use antennas k=ms+1 to k=d for the non-MIMO transmission.

As discussed above, in some cases, the same antenna may be used for multiple frequency transmissions (e.g., multiple MIMO transmissions, multiple non-MIMO transmissions, or a combination of both). In one example, a first MIMO transmission at a first transmitting frequency and a second MIMO transmission at a second transmitting frequency (e.g., e.g., 2.4 GHz MIMO+5 GHz MIMO) may be transmitted using the same antennas k=1 to k=m. In this example, the combined normalized SAR distribution may be given as follows:

$$SAR_{norm\_combined} = \sum_{k=1}^{m} \frac{T_{x_k}}{P_{limitk}} \cdot SAR_{norm\_MIMO\_f1\_k} + \sum_{k=1}^{m} \frac{T_{x_k}}{P_{limitk}} \cdot SAR_{norm\_MIMO\_f2\_k} + \sum_{k=m+1}^{d} \frac{T_{x_k}}{P_{limitk}} SAR_{norm\_k} \quad (14)$$

where $SAR_{norm\_MIMO\_f1\_k}$ are the normalized MIMO SAR distributions for the first MIMO transmission at the first transmitting frequency, and $SAR_{norm\_MIMO\_f1\_k}$ are the normalized MIMO SAR distributions for the second MIMO transmission at the second transmitting frequency. In this example, the wireless device 100 may use antennas k=1 to k=m for both MIMO transmissions, and antennas k=m+1 to k=d for the non-MIMO transmission. For cases where there is no simultaneous non-MIMO transmission, the non-MIMO transmission term in equation (14) may be omitted.

Although the normalized MIMO SAR distribution for each k'h antenna in equation (10) is non-linear, it may be precomputed one-time based on equation (10) for a given operating frequency band and a given subset of antennas and stored in the memory 115. This allows the processor 110 to retrieve the normalized MIMO SAR distributions for all MIMO antennas from the memory 115 to compute the combined normalized MIMO SAR without having to perform the non-linear operations to compute the normalized MIMO SAR distributions in real time. In addition, the same set of normalized MIMO SAR distributions can be used to determine the combined normalized SAR distribution (e.g., equations (11). (12), (13), and (14)) for various transmission power levels by scaling each normalized MIMO SAR distribution based on the respective transmission power level (i.e., power level of the respective antenna). This is possible because, for each antenna, the transmission power scaler (i.e., $Tx_k/P_{limitk}$) for the antenna is located outside the non-linear expression for the respective normalized MIMO SAR distribution in equation (10). As a result, the normalized MIMO SAR distribution for an antenna may be precomputed once (e.g., equation (10)) and used for various transmission power levels for the antenna by scaling the normalized MIMO SAR distribution with the respective transmission power scaler (e.g., in equations (11). (12). (13), and (14)). In contrast, in equations (7), (8), and (9), the transmission power scaler for each MIMO antenna is inside the respective square root term. As a result, computing the combined normalized SAR distribution for various transmission power levels based on equations (7), (8), and (9) would require performing non-linear operations for each transmission power level, which can consume a large amount of computational resources.

The combined normalized SAR distribution allows the processor 110 to assess RF exposure compliance for one or more MIMO transmissions. RF exposure compliance is met when the peak value in the combined normalized SAR distribution is equal to or less than a normalized value of one (i.e., which may correspond to SAR design target, which may be less than the RF exposure limit to account for device uncertainties).

Since the combined normalized SAR distribution is a linear combination of the normalized MIMO SAR distributions for the individual antennas, the combined normalized MIMO SAR can be computed in a linear operation, which is computationally similar to the linear combining operation for the non-MIMO case given in equation (6). Because the above operation is linear, the processor 110 can perform the above operation using significantly less computational resources and power compared with the non-linear operation given in equations (7). (8), and (9). This allows the processor 110 to efficiently compute the combined normalized SAR distribution for a MIMO transmission in real time.

Although aspects of the present disclosure are illustrated above using the example of SAR distributions, it is to be understood that aspects of the present disclosure not limited to the example of SAR distributions. For example, aspects of the present disclosure may be applied to cases where RF exposure is assessed using power density (PD) distributions or a combination of PD distributions and SAR distributions, as discussed further below. In general, it to be understand that the present disclosure is not limited to a particular type of RF exposure distribution, and that aspects of the present disclosure are generally applicable to other types of RF exposure distributions, as discussed further below.

The processor 110 may perform the above MIMO combining operation (e.g., equation (11), (12). (13), and (14)) to determine a set of maximum allowable power levels for the transmitting antennas (e.g., antennas 130-1 to 130-N) for a future transmission (e.g., in a future time slot) that comply with an RF exposure limit (e.g., SAR design target, which is lower than the regulatory limit to account for device uncertainties and/or to budget additional safety margin needed for simultaneous transmission scenarios with other radios). During the future time slot, the transmission power levels for the transmitting antennas are constrained (i.e., bounded) by the respective maximum allowable power levels to ensure RF exposure compliance, as discussed further below. In the present disclosure, the term "maximum allowable power level" refers to a "maximum allowable power level" imposed by an RF exposure limit (e.g., time-averaged RF exposure limit) unless stated otherwise. It is to be appreciated that the "maximum allowable power level" is not necessarily equal to the absolute maximum power level that complies with an RF exposure regulatory limit (e.g., regulator SAR limit having no safety margin) and may be less than the absolute maximum power level that complies with the RF exposure limit (e.g., SAR design target less than the regulatory SAR limit to provide a safety margin to account for device uncertainties and/or budget for simultaneous transmission scenarios with other transmitters). As used herein, the term "future transmission" refers to a transmission in the future with respect to the time that the processor 110 determines the maximum allowable power levels for the future transmission. In other words, the maximum allowable power levels for the future transmission are computed before they are needed for the future transmission. As used herein, the term "future time slot" refers to a time slot (i.e., time interval or time duration) in the future with respect to the time that the processor 110 determines the maximum allowable power levels for the transmitting antennas. Determining the maximum allowable power levels for the future time slot before the future time slot helps ensure RF exposure compliance (e.g., time-average RF exposure compliance) is met during the future time slot.

In one example, the transmit circuits (e.g., transmit circuits 120-1 to 120-N) coupled to the transmitting antennas (e.g., antennas 130-1 to 130-N) have respective power level limits. In this example, the output transmission power level of each transmit circuit may be constrained (i.e., bounded) by the respective power level limit. In this example, the processor 110 may constrain the transmission power levels for the transmitting antennas to the respective maximum allowable power levels by setting the power level limits of the respective transmit circuits to the respective maximum allowable power levels, as discussed further below.

Figure 4:
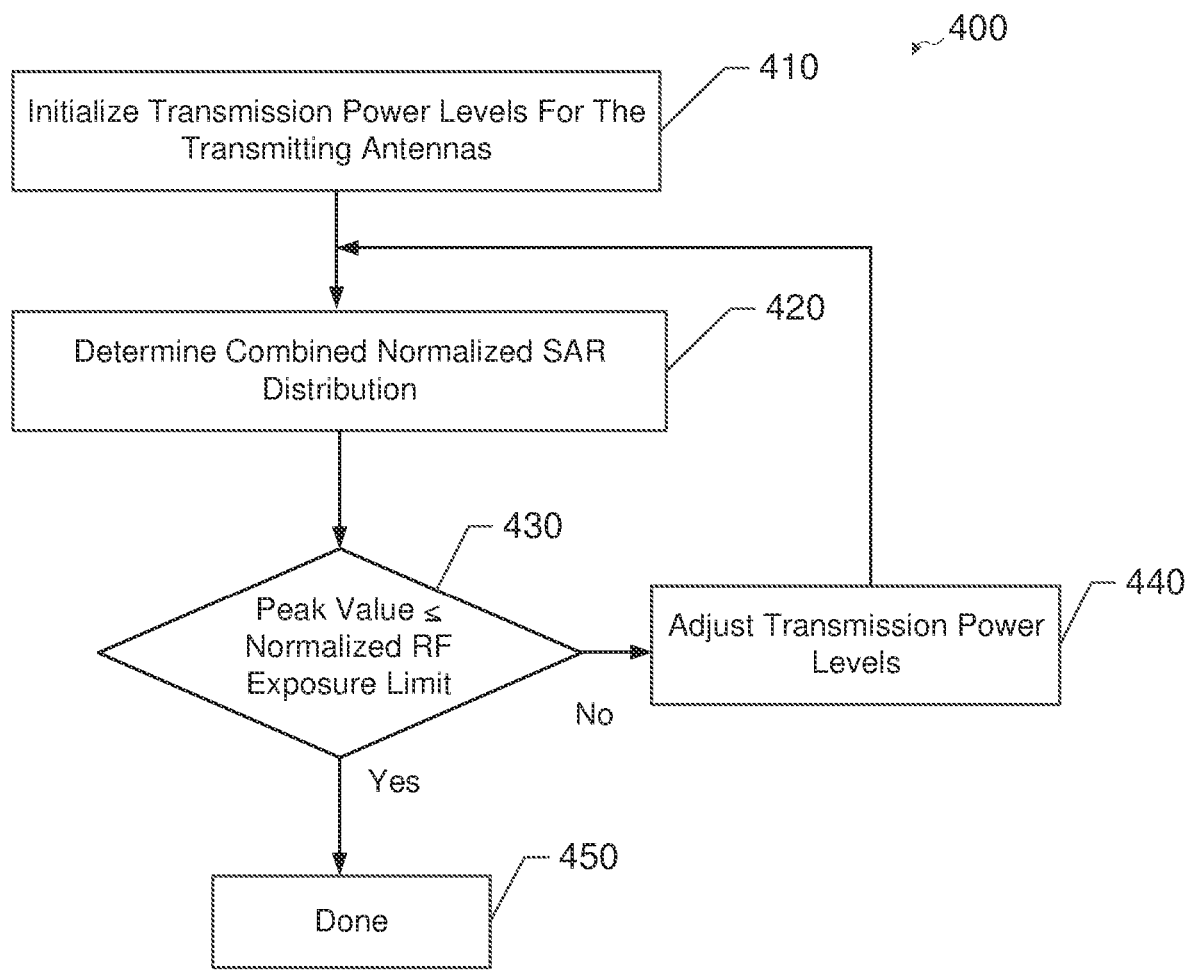
FIG. 4 is a flowchart illustrating an exemplary method for determining maximum allowable power levels for transmitting antennas according to certain aspects of the present disclosure.

The processor 110 may determine the maximum allowable power levels for the transmitting antennas (e.g., antennas 130-1 to 130-N) for a future transmission by performing the exemplary method 400 illustrated in FIG. 4.

At block 410, the processor 110 initializes the transmission power levels for the transmitting antennas. The transmission power levels for the transmitting antennas may be initialized according to one or more power control loops, one or more desired data rates, one or more desired beam directions or sectors, etc. In one example, the transmission power levels may be initialized to a set of default transmission power levels.

At block 420, the processor 110 determines a combined normalized SAR distribution based on the transmission power levels (e.g., $Tx_k$) in block 410. To do this, the processor 110 may scale the normalized MIMO SAR distribution for each of the transmitting antennas by the respective transmission power scaler (e.g., $Tx_k/P_{limit_k}$), and linearly combine the scaled normalized MIMO SAR distributions for the transmitting antennas (e.g., based on any one of equations (11), (12), and (13)) to obtain the combined normalized SAR distribution. The processor 110 may retrieve the normalized MIMO SAR distributions for the individual antennas from the memory 115, in which the normalized MIMO SAR distributions are precomputed (e.g., based on equation (10)).

At block 430, the processor 110 compares the peak value in the combined normalized SAR distribution with a normalized RF exposure limit (e.g., one). For the example in which the combined MIMO SAR distribution is not normalized, the RF exposure limit may be approximately equal to an RF exposure limit (e.g., SAR design target that may be less than regulatory SAR limit to account for design uncertainties). If the peak value in the combined normalized SAR distribution is equal to or less than the normalized RF exposure limit (e.g., one), then the processor 110 determines that the transmission power levels comply with the RF exposure limit. In this case, the method 400 ends at block 450, and the processor 110 may use the transmission power levels as the maximum allowable power levels for the transmitting antennas for the future transmission. In this case, the transmission power levels during the future transmission are constrained by the maximum allowable power levels.

If the peak value in the combined normalized SAR distribution is greater than the normalized RF exposure limit (e.g., one), then the processor 110 adjusts the transmission power levels at block 440. For example, the processor 110 may adjust the transmission power levels by reducing one or more of the transmission power levels. In one example, the processor 110 may scale down the transmission power levels for the transmitting antennas by the same scaler.

The processor 110 then repeats block 420 and 430 using the adjusted transmission power levels (i.e., determines the combined normalized SAR distribution in block 420 using the adjusted transmission power levels). The processor 110 may repeat block 440, 420 and 430 until the peak value in the combined normalized SAR distribution is equal to or less than normalized RF exposure limit (e.g., one), at which point the transmission power levels comply with the RF exposure limit (e.g., SAR design target). The transmission power levels that comply with the RF exposure limit may then be used as the maximum allowable power levels for the transmitting antennas for the future transmission.

After the processor 110 determines the maximum allowable power levels, the processor 110 constrains (i.e., bounds) the transmission power levels for the transmitting antennas during the future transmission by the respective maximum allowable power levels. As discussed above, the processor 110 may do this for each transmitting antenna by setting the power level limit of the respective transmit circuit (i.e., transmit circuit coupled to the antenna) to the respective maximum allowable power level. This prevents the output transmission power level of each of the transmit circuits from exceeding the respective maximum allowable power level.

In aspects where there is also a non-MIMO transmission (e.g., SISO transmission), the non-MIMO transmission term in equation (9) (i.e., the rightmost term in equation (9)) may be included in the combined normalized SAR distribution computed in block 420 (e.g., equation (13)) to account for the SAR contribution from the non-MIMO transmission. The non-MIMO transmission term combines the SAR distributions for the non-MIMO transmission, in which each of the SAR distributions may correspond to a respective one of the active antennas (e.g., k=m+1 to k=d) used for the MIMO transmission. In this case, the combined normalized SAR distribution in block 420 is a combination of the combined normalized MIMO SAR distributions and the combined normalized non-MIMO SAR distributions (i.e., SAR distributions for the non-MIMO transmission).

It is to be appreciated that the present disclosure is not limited to the exemplary method 400 illustrated in FIG. 4, and that other methods may be employed to determine the maximum allowable power levels for the transmitting antennas that comply with the RF exposure limit. For example, the processor 110 may determine maximum allowable power levels that result in the peak value in the combined normalized SAR distribution being equal to or less than one for a conservative approximate analysis to determine the maximum allowable power levels with fewer computations. For the example in which the combined MIMO SAR distribution is not normalized, the peak value in the combined MIMO SAR distribution may be equal to or less than an RF exposure limit. The RF exposure limit may be equal to an RF exposure limit set by a regulator or less than the RF exposure limit set by the regulator (e.g., SAR design target to provide a safety margin to account for device uncertainties or to budget SAR margin for complying with total RF exposure in simultaneous transmission scenarios with other transmitters).

When the transmission scenario changes (i.e., change in MIMO/SISO transmissions and/or active antennas involved), then the exemplary method 400 illustrated in FIG. 4 may be re-evaluated for the active transmission scenario to determine the maximum allowable transmit powers for the transmitting antennas for a future transmission.

In certain cases, an RF exposure regulation requires that a time-averaged RF exposure over an averaging time window not exceed an RF exposure limit. This allows the wireless device 100 to briefly exceed the RF exposure limit as long as the time-averaged RF exposure over the averaging time window does not exceed the RF exposure limit.

In this regard, the processor 110 may assess time-averaged RF exposure compliance as follows. The processor 110 may compute a time-averaged combined normalized SAR distribution over the averaging time window (e.g., 6 minutes), and compare the peak value in the time-averaged combined normalized SAR distribution with one (here, one corresponds to an RF exposure limit, e.g., SAR design target) to assess time-averaged RF exposure compliance. If the peak value is equal to or less than one, then the processor 110 may determine time-averaged RF exposure compliance. If the time-averaged combined MIMO SAR distribution is not normalized, then the peak value should be equal to or less than the RF exposure limit (e.g., SAR design target) for compliance.

Figure 5:
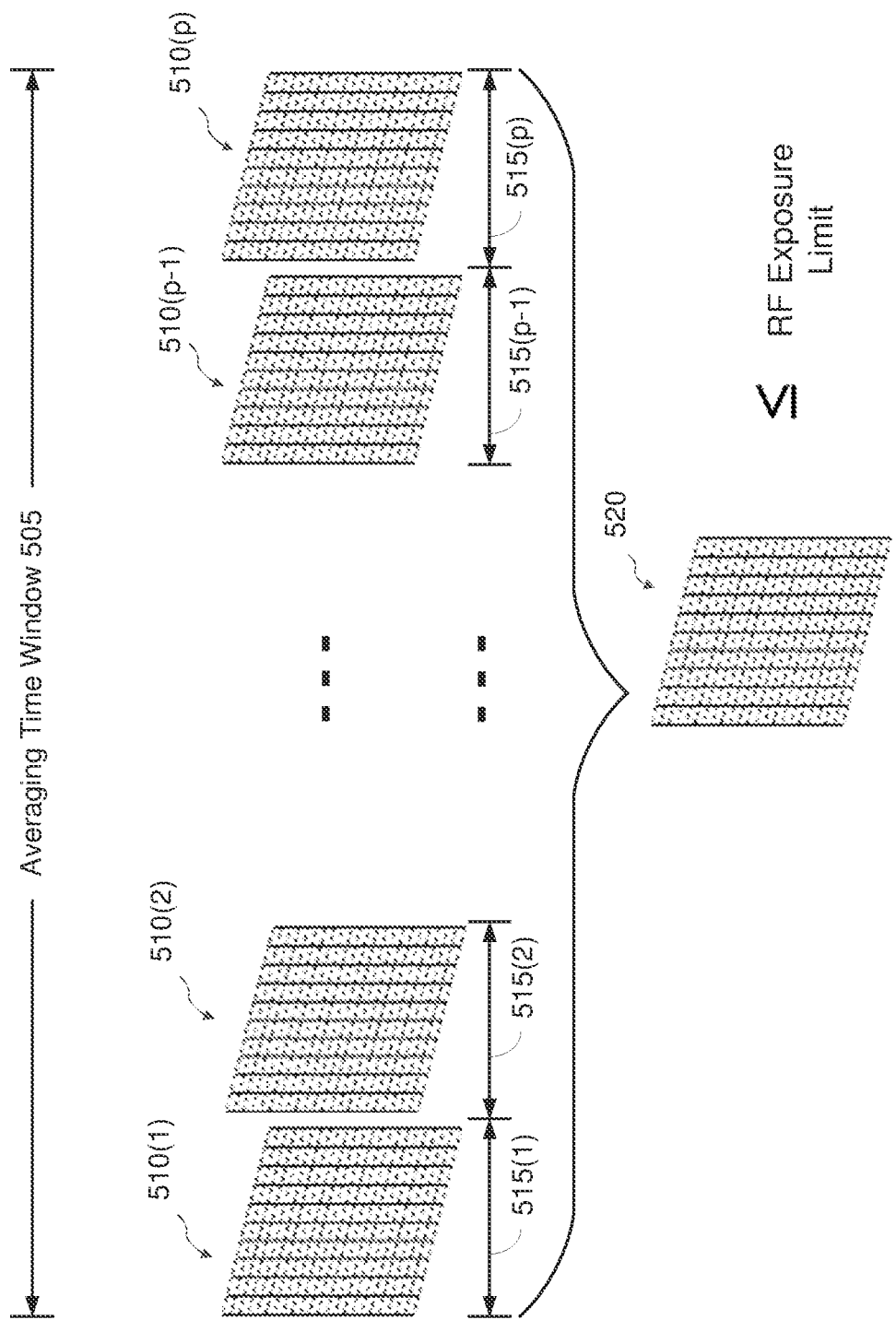
FIG. 5 shows a visual representation of a time-averaged SAR distribution according to certain aspects of the present disclosure.

In this regard, FIG. 5 illustrates an example in which the processor 110 computes a time-averaged combined normalized SAR distribution over an averaging time window 505 (e.g., 6 minutes). In this example, the averaging time window 505 is divided into multiple time slots (i.e., time intervals). For instance, a 6-minute averaging time window may be divided into 5-second time slots. In the example shown in FIG. 5, there are p number of time slots 515(1) to 515(p) within the averaging time window 505, where each of the p time slots 515(1) to 515(p) has a corresponding combined normalized SAR distribution 510(1) to 510(p). Thus, in this example, the averaging time window 505 includes p time slots 515(1) to 515(p). Although each of the combined normalized SAR distributions 510(1) to 510(p) is depicted as a two-dimensional distribution in FIG. 5, it is to be appreciated that the present disclosure is not limited to this example. For example, the combined normalized SAR distribution 510(1) to 510(p) for each time slot 515(1) to 515(p) may be a combination of normalized SAR distributions (e.g., SAR distributions 310-1 to 310-m), e.g., for different antennas (e.g., antennas 130-1 to 130-N). In this example, each normalized SAR distribution 510(1) to 510(p) may be a separate instance of the combined SAR distribution 320 illustrated in FIG. 3.

The processor 110 may determine the combined normalized SAR distribution for each time slot (e.g., based on any one of equations (11), (12), (13), and (14)). The combined normalized SAR distribution for a time slot may be generated by combining multiple normalized MIMO SAR distributions where each of the normalized MIMO SAR distributions corresponds to one of the transmitting antennas (e.g., one of the m MIMO antennas among the antennas 130-1 to 130-N). For the case where a non-MIMO transmission is also present, the combined normalized SAR distribution for a time slot may also include normalized SAR distributions for the non-MIMO transmission (e.g., rightmost term in equation (9)). For the case in which different transmission power levels are used for the transmitting antennas, the processor 110 may scale the normalized MIMO SAR distribution for each transmitting antenna by the respective transmission power scaler before the combining. If the transmission power level for a transmitting antenna varies within the time slot, then the processor 110 may scale the respective normalized MIMO SAR distribution by a time-average of the transmission power scaler for the antenna over the time slot.

The processor 110 may average the combined normalized SAR distributions 510(1) to 510(p) for the time slots 515(1) to 510(p) over the averaging time window 505 to generate a time-averaged combined normalized SAR distribution 520. For example, the processor 110 may compute the time-averaged combined normalized SAR distribution 520 by combining the combined normalized SAR distributions 510(1) to 510(p) for the time slots 515(1) to 515(p) and dividing the resulting combined normalized SAR distribution by the number of time slots as given by the following:

$$SAR_{avaerage} = \frac{1}{p}\sum_{j=1}^{p} SAR_{SAR_{norm\_combined\_j}} \quad (15)$$

where $SAR_{average}$ is the time-averaged combined normalized SAR distribution over the averaging time window 505, j is an index for the time slots 515(1) to 515(p), and $SAR_{norm\_combined\_j}$ is the combined normalized SAR distribution for the $j^{th}$ time slot 515(j). As discussed above, the combined normalized SAR distribution for a time slot is a combination of multiple normalized MIMO SAR distributions where each of the normalized MIMO SAR distributions corresponds to a respective one of the transmitting antennas. For the case where a non-MIMO transmission is also present, the combined normalized SAR distribution for a time slot may also include normalized SAR distributions for the non-MIMO transmission (e.g., last term in equation (9)). The processor 110 may compare the peak value in the time-averaged combined normalized SAR distribution 520 with a normalized value of one (here, one corresponds to an RF exposure limit (e.g., SAR design target)) to assess time-averaged RF exposure compliance. If the peak value is equal to or less than one, then the processor 110 may determine time-averaged RF exposure compliance. For the example in which the time-averaged combined MIMO SAR distribution is not normalized, the peak value in SAR distribution 520 should be equal to or less than the RF exposure limit (e.g., SAR design target).

In certain aspects, the processor 110 may determine maximum allowable power levels for a future time slot to ensure time-averaged RF exposure compliance. In this regard, the time slots 515(1) to 515(p-1) in FIG. 5 may correspond to previous transmissions by the wireless device 100, and the time slot 515(p) may correspond to the future time slot. In this regard, the time slot 515(p) is referred to as the future time slot below. In this case, equation (15) may be written as follows:

$$SAR_{average} = \frac{1}{p}\left[\left(\sum_{j=1}^{p-1} SAR_{norm\_combined\_j}\right) + SAR_{norm\_combined\_p}\right] \quad (16)$$

where $SAR_{norm\_combined\_p}$ is the combined normalized SAR distribution for the future time slot 515(p). The time slots 515(1) to 515(p-1) are previous time slots. In the present disclosure, the term "previous time slot" refers to a time slot that precedes the future time slot.

In this example, it is assumed that the transmission power levels for the combined normalized SAR distributions 510(1) to 510(p-1) are known by the processor 110 since they correspond to previous transmissions by the wireless device 100. For example, the processor 110 may record the transmission power levels for each of the time slots 515(1) to 515(p-1) in the memory 115, and use the recorded transmission power levels for the time slots 515(1) to 515(p-1) to determine the combined normalized SAR distributions 510 (1) to 510(p-1) for these time slots. For time slots 515(1) to 515(p-1), the combined normalized SAR distribution for the $j^{th}$ time slot 515(j) may be determined, for example, based on any one of equations (11), (12), (13), and (0.14) for all the transmitting antennas that were active during the $j^{th}$ time slot 515(j).

In this example, the transmission power levels for the combined normalized SAR distribution 510(p) corresponding to the future time slot 515(p) are variables to be solved by the processor 110. To determine maximum allowable power levels for the future time slot 515(p), the processor 110 may compute the time-averaged combined normalized SAR distribution 520 in which the transmission power levels for the future time slot 515(p) are variables in the time-averaged combined normalized SAR distribution 520 (i.e., the time-averaged combined normalized SAR distribution is a function of the transmission power levels for the future time slot 515(p)). The processor 110 may then determine transmission power levels for the future time slot 515(p) such that the peak value in the time-averaged combined normalized SAR distribution is equal to or less than a normalized RF exposure limit (e.g., one). The processor 110 may then use the determined transmission power levels as the maximum allowable power levels for the future time slot 515(p). The processor 110 may determine the maximum allowable power levels for the future time slot 515(p) during time slot 515(p-1) so that the maximum allowable power levels for the future time slot 515(p) are ready at the start of the future time slot 515(p). For the case of MIMO, each of the maximum allowable power levels corresponds to a respective one of the transmitting antennas in the future time slot 515(p). If the future time slot has both active MIMO and active non-MIMO transmissions, then the rightmost term in equation (9) may be included to determine the combined normalized SAR distribution for 510(p) and the transmission power levels for all active MIMO and non-MIMO antennas can be solved as variables. During the future time slot 515(p), the processor 110 constrains the transmission power levels for the transmitting antennas by the respective maximum allowable power levels. As discussed above, the processor 110 may do this for each transmitting antenna (e.g., each of the antennas 130-1 to 130-N) by setting the power level limit of the respective transmit circuit (e.g., respective one of the transmit circuits 120-1 to 120-N) to the respective maximum allowable power level.

Figure 6:
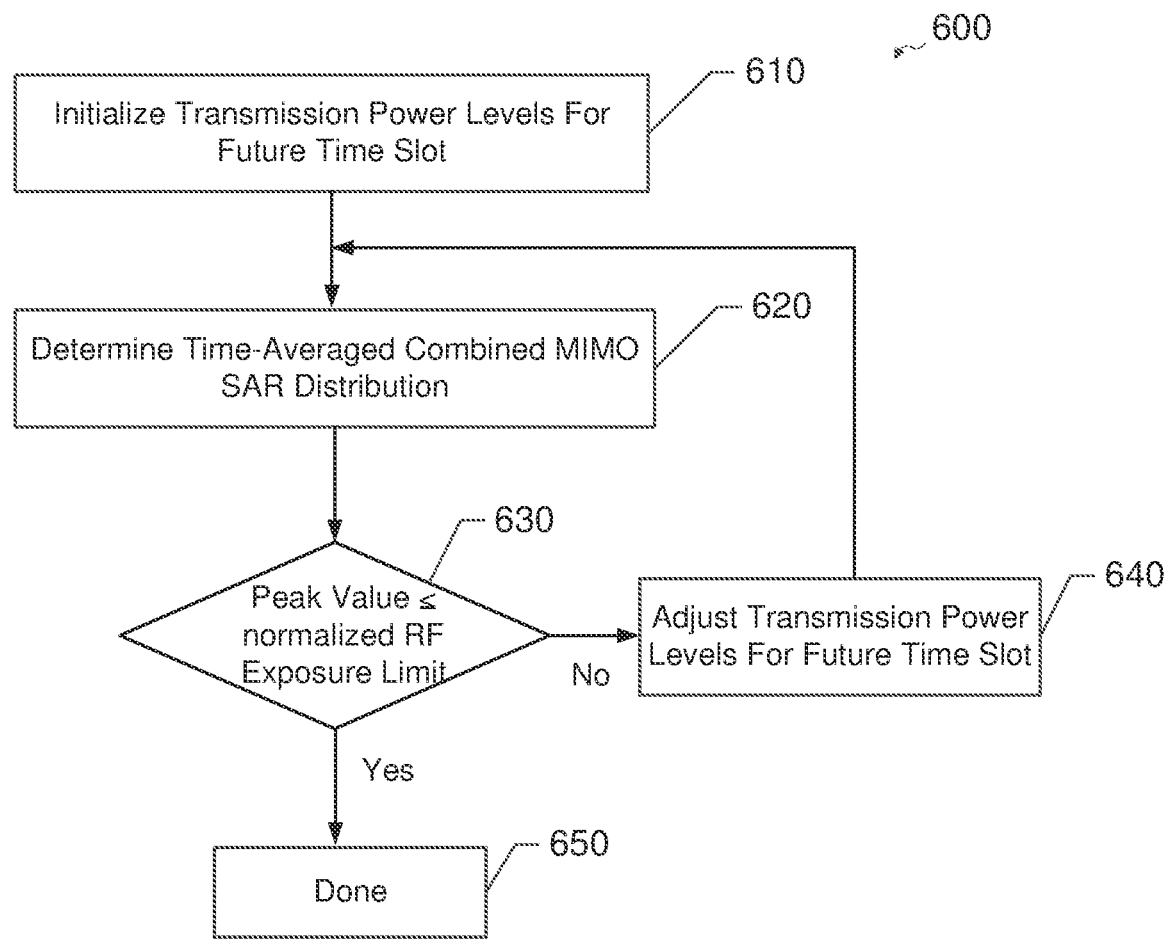
FIG. 6 is a flowchart illustrating an exemplary method for determining maximum allowable power levels for transmitting antennas that comply with a time-averaged RF exposure limit according to certain aspects of the present disclosure.

The processor 110 may determine the maximum allowable power levels for the future time slot 515(p) according to the exemplary method 600 illustrated in FIG. 6. At block 610, the processor 110 initializes the transmission power levels for the future time slot 515(p). The transmission power levels may be initialized according to a power control loop, a desired data rate, a desired beam direction or sector, etc. In one example, the transmission power levels may be initialized to a set of default transmission power levels.

At block 620, the processor 110 determines the time-averaged combined normalized SAR distribution over the averaging time window 505 based on the transmission power levels at block 610 for the future time slot 515(p) and the transmission power levels for the previous time slots 515(1) to 515(p-1). Note that the transmission power levels for the previous time slots 515(1) to 515(p-1) are known by the processor 110, as discussed above.

At block 630, the processor 110 compares the peak value in the time-averaged combined normalized SAR distribution with the normalized RF exposure limit of one to assess time-averaged RF exposure compliance. If the peak value is equal to or less than the normalized RF exposure limit, then the method 600 ends at block 650. In this case, the processor 110 uses the transmission power levels initialized at block 610 as the maximum allowable power levels for the future time slot 515(p).

If the peak value is greater than one, then the processor 110 adjusts the transmission power levels for the future time slot 515(p) at block 640. The processor 110 may adjust the transmission power levels for the future time slot 515(p) by reducing one or more of the transmission power levels for the future time slot 515(p). In one example, the processor 110 may scale down the transmission power levels by the same scaler. For the example of MIMO, each of the transmission power levels corresponds to a respective one of the transmitting antennas in the future time slot 515(p).

The processor 110 then repeats blocks 620 and 630 using the adjusted transmission power levels for the future time slot 515(p). The processor 110 may repeat blocks 640, 620 and 630 until the peak value in the time-averaged combined normalized SAR distribution is equal to or less than one, at which point the transmission power levels comply with the RF exposure limit. The processor 110 may then use the transmission power levels that comply with the RF exposure limit as the maximum allowable power levels for the future time slot 515 (p).

After the processor 110 determines the maximum allowable power levels for the future time slot, the processor 110 constrains (i.e., bounds) the transmission power levels for the transmitting antennas during the future time slot 515(p) by the respective maximum allowable power levels. As discussed above, the processor 110 may do this for each transmitting antenna by setting the power level limit of the respective transmit circuit (i.e., transmit circuit coupled to the antenna) to the respective maximum allowable power level.

It is to be appreciated that the present disclosure is not limited to the exemplary method 600 illustrated in FIG. 6, and that other methods may be employed to determine transmission power levels for the future time slot 515(p) such that the time-averaged combined normalized SAR distribution complies with the normalized RF exposure limit of one. For example, the processor 110 may determine maximum allowable power levels for the transmitting antennas in the future time slot 515(p) that result in the peak value of the time-averaged combined normalized SAR distribution being equal to or less than one (i.e., normalized RF exposure limit) for a conservative approximate analysis to determine the maximum allowable power levels with fewer computations. The RF exposure limit (e.g., SAR design target) discussed above may be equal to an RF exposure limit set by a regulator or less than the RF exposure limit set by the regulator (e.g., to provide a safety margin to account for device uncertainties and/or to budget additional margin to comply with total RF exposure in simultaneous transmission scenarios with other transmitters).

The averaging time window 505 may be a moving time-averaging window. In this case, the processor 110 shifts the averaging time window 505 by one time slot each time the processor 110 determines maximum allowable power levels for a new future time slot. For example, in the above discussion, time slot 515(p) is given as the future time slot. To determine the maximum allowable power levels for the next future time slot 515(p+1), the processor 110 shifts the averaging time window 505 by one time slot to cover time slots 515(2) to 515(p+1). Note that the first time slot 515(1) in the previous determination of the maximum allowable power levels is dropped from the averaging time window 505, and the future time slot 515(p) in the previous determination of the maximum allowable power levels becomes the last known exposure level (based on recent transmission) out of the previous time slots in the averaging time window 505.

As discussed above, for the MIMO case, the linear MIMO combining operation (e.g., based on any one of equations (11), (12), (13), and 914)) according to aspects of the present disclosure allows the processor 110 to efficiently compute combined normalized SAR distributions. This is especially beneficial for the case where the processor 110 frequently computes combined normalized SAR distributions (e.g., at least once every time slot) to assess time-averaged RF exposure compliance (e.g., once every time slot) in the MIMO case. In this case, the non-linear MIMO combining operation given in equations (7), (8), and (9) may be too computationally intensive for the processor 110 to perform at every time slot. The linear MIMO combining operation according to aspects of the present disclosure (e.g., based on any one of equations (11). (12), (13), and (14)) significantly reduces the amount of computational resources and power needed by the processor 110 to assess time-averaged RF exposure in the MIMO transmission case compared with the non-linear MIMO combining operation given in equations (7), (8), and (91).

As discussed above, the processor 110 may determine a maximum allowable power level for a transmitting antenna during a future time slot and set the power level limit for the corresponding transmit circuit based on the determined maximum allowable power level. In certain aspects, setting the power level limit of the transmit circuit based on the determined maximum allowable power level prevents the output transmission power level of the transmit circuit from exceeding the maximum allowable power level at any time during the future time slot (i.e., the instantaneous transmission power level cannot exceed the maximum allowable power level during the future time slot).

In other aspects, setting the power level limit of the transmit circuit based on the determined maximum allowable power level prevents a time-average of the transmission power level of the transmit circuit over the future time slot from exceeding the maximum allowable power level. This allows the instantaneous transmission power level of the transmit circuit to temporarily exceed the maximum allowable power level within the future time slot as long as the time-averaged transmission power level of the transmit circuit over the future time slot does not exceed the maximum allowable power level. For example, in time division duplexing (TDD) schemes with a fixed duty cycle (e.g., GSM) or with a maximum duty cycle specified by a network in a radio resource control (RRC) message in the case of dynamic duty cycle schemes (e.g., 5G NR), the instantaneous transmission power level may be equal to the maximum allowable power level/(fixed duty cycle or maximum RRC duty cycle), where $0 \leq$ duty cycle $\leq 1$. In these aspects, the transmit circuit is permitted to transmit at a transmission power level exceeding the maximum allowable power level for a time interval shorter than the future time slot as long as the time-averaged transmission power level over the future time slot does not exceed the maximum allowable power level. In these aspects, the maximum allowable power level is a maximum allowable time-average power level over the future time slot.

During the future time slot, the transmission power levels of the transmit circuits 120-1 to 120-N may be set by a power control operation performed by the processor 110. The power control operation may set the transmission power levels using a power control loop, as discussed above. The power control operation may also set the transmission power levels based on data rate and/or one or more other parameters. The power control operation may set the transmission power levels of the transmit circuits 120-1 to 120-N, for example, by setting the gains of the amplifiers 250-1 to 250-N in the transmit circuits 120-1 to 120-N. In this example, setting the power level limits of the transmit circuits 120-1 to 120-N to the respective maximum allowable power levels constrains (i.e., bounds) the transmission power levels that can be set by the power control operation for the transmit circuits 120-1 to 120-N. In one example, the power control operation is prevented from setting the transmission power levels to levels exceeding the maximum allowable power levels at any time during the future time slot. In another example, the power control operation is allowed to temporarily set the transmission power levels to levels exceeding the maximum allowable power levels during the future time slot as long as the time-average of the transmission power levels over the future time slot do not exceed the maximum allowable power levels. In this example, the maximum allowable power levels are maximum allowable time-average power levels over the future time slot.

Although aspects of the present disclosure are discussed above using the example of SAR distributions, it is to be appreciated that aspects of the present disclosure are not limited to SAR distributions, and are applicable to other types of RF exposure distributions. For example, aspects of the present disclosure may be applied to cases where RF exposure is assessed using power density (PD) distributions or a combination of PD distributions and SAR distributions. For example, MIMO PD distributions may be computed (e.g., based on any one or more of equations (10) to (14)) by replacing each instance of a SAR distribution with a corresponding PD distribution and replacing the SAR limit with a PD limit (e.g., a PD limit set by a regulator or a PD limit lower than the PD limit set by a regulator to account for device uncertainties). In this example, the SAR distribution for an antenna (e.g., one of the antennas 130-1 to 130-N) may be replaced with a PD distribution for the antenna, and a normalized PD distribution may be a PD distribution normalized with respect to a PD limit. A PD distribution may include a set of PD values. For example, the PD distribution may include two PD values, 5 or more PD values, tens of PD values, or even hundreds or thousands of PD values. The PD values in the distribution may correspond to variations in PD for a transmit scenario. In some examples, the PD distribution is representative of a map such that each PD value in the distribution corresponds to a different spatial location (e.g., on the model of the human body) or portion of user tissue. In some examples, the values in the PD distribution are representative of exposure(s) at a given time. In general, it to be understand that the present disclosure is generally applicable to RF exposure distributions, of which SAR distributions and PD distributions are examples. An RF distribution may include a set of RF exposure values, where an RF exposure value is a measurement of RF exposure. In some examples, the values in the RF distribution are representative of exposure(s) at a given time.

Figure 7:
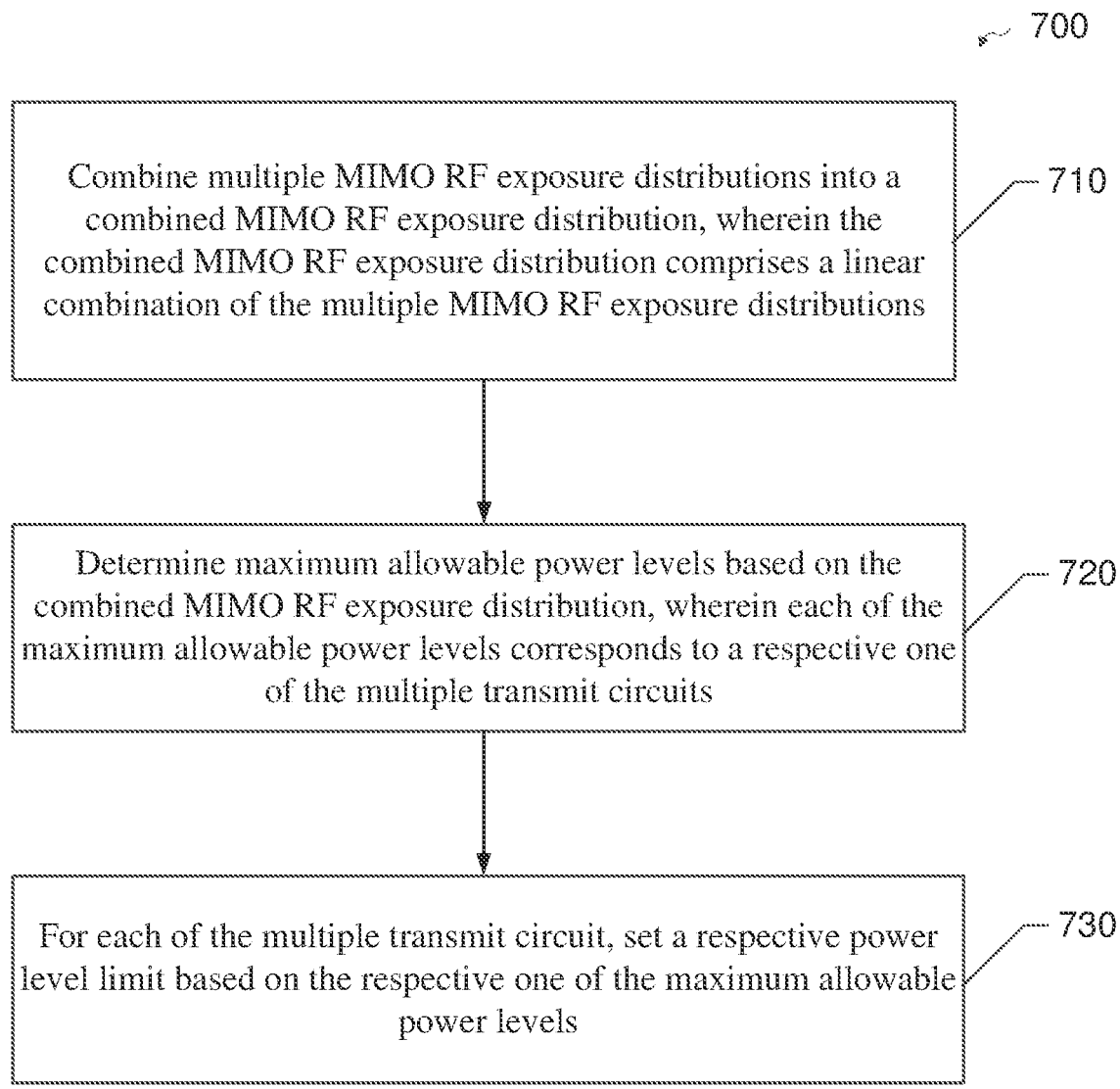
FIG. 7 is a flowchart illustrating a method for operating a wireless device according to certain aspects of the present disclosure.

FIG. 7 is a flowchart illustrating a method 700 for operating a wireless device according to certain aspects of the present disclosure. The wireless device (e.g., wireless device 100) includes multiple transmit circuits (e.g., transmit circuits 120-1 to 120-N), wherein the multiple transmit circuits are configured to transmit multiple signals via multiple antennas (e.g., antennas 130-1 to 130-N).

At block 710, multiple MIMO RF exposure distributions are combined into a combined MIMO RF exposure distribution, wherein the combined RF exposure distribution comprises a linear combination of the multiple normalized MIMO RF exposure distributions. For example, each of the MIMO RF exposure distributions may include a respective MIMO specific absorption rate (SAR) distribution. In another example, each of the MIMO RF exposure distributions may include a respective MIMO power density (PD) distribution. For example, the processor 110 may combine the MIMO RF exposure distributions in a linear operation (e.g., based on any one of equations (11), (12), (13), and (14) or any combination thereof).

At block 720, maximum allowable power levels are determined based on the combined MIMO RF exposure distribution, wherein each of the maximum allowable power levels corresponds to a respective one of the multiple transmit circuits. In one example, the maximum allowable power levels may be determined by determining transmission power levels that result in a peak value of the combined normalized RF exposure distribution being equal to or below an exposure limit (e.g., normalized exposure limit of one), wherein each of the MIMO RF exposure distributions in the combined RF exposure distribution is scaled based on a respective one of the transmission power levels. In another example, the combined normalized RF exposure (e.g., SAR) distribution corresponds to a future time slot (e.g., future time slot 515($p$)). In this example, the maximum allowable power levels may be determined by averaging the combined MIMO RF exposure distribution with the combined MIMO RF exposure distributions of previous time slots (e.g., previous time slots 515(1) to 515($p$-1)) to obtain a time-averaged combined MIMO RF exposure distribution, and determining transmission power levels that result in a peak value of the time-averaged combined MIMO RF exposure distribution being equal to or below a normalized exposure limit of one. The maximum allowable power levels may be determined by the processor 110.

At block 730, for each of the multiple transmit circuits, a respective power level limit is set based on the respective one of the maximum allowable power levels. In this example, setting the power level limit of a transmit circuit to the respective maximum allowable power level constrains (i.e., bounds) the transmission power level of the transmit circuit to the respective maximum allowable power level or constrains (i.e., bounds) a time-average of the transmission power level of the transmit circuit over the future time slot to the respective maximum allowable power level. The power level limits may be set by the processor 110.

In certain aspects, each of the MIMO RF exposure distributions may include a first component and a second component, the first component comprising a RF exposure distribution for a respective one of the antennas, and the second component accounting for a correlation between the respective one of the antennas and each of other ones of the antennas. In certain aspects, the second component for each of the MIMO RF exposure distributions comprises a sum of multiple components, each of the multiple components comprising a square root of a product of the RF exposure distribution for the respective one of the antennas and an RF exposure distribution for a respective one of the other ones of the antennas (e.g., based on equation (10)).

In certain aspects, the memory 115 may include a computer readable medium including instructions stored thereon that, when executed by the processor 110, cause the processor 110 to perform the methods and operations described herein. The computer readable medium may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other tangible non-transitory storage medium, or any combination thereof.

Implementation examples are described in the following numbered clauses:

1. A wireless device, comprising:
   multiple transmit circuits, wherein the multiple transmit circuits are configured to transmit multiple radio frequency (RF) signals via multiple antennas; and
   a processor coupled to the transmit circuits, wherein the processor is configured to:
   combine multiple-input-multiple-output (MIMO) radio frequency (RF) exposure distributions into a combined MIMO RF exposure distribution, wherein the combined MIMO RF exposure distribution comprises a linear combination of the MIMO RF exposure distributions;
   determine maximum allowable power levels based on the combined MIMO RF exposure distribution, wherein each of the maximum allowable power levels corresponds to a respective one of the transmit circuits; and
   for each of the transmit circuits, set a respective power level limit based on the respective one of the maximum allowable power levels.

2. The wireless device of clause 1, wherein each of the MIMO RF exposure distributions comprises a respective MIMO specific absorption rate (SAR) distribution.

3. The wireless device of clause 1, wherein each of the MIMO RF exposure distributions comprises a respective MIMO power density (PD) distribution.

4. The wireless device of any one of clauses 1 to 3, wherein the transmit circuits are configured to transmit the RF signals at a same transmitting frequency.

5. The wireless device of any one of clauses 1 to 4, wherein each of the MIMO RF exposure distributions comprises a first component and a second component, the first component comprising an RF exposure distribution for a respective one of the antennas, and the second component accounting for a correlation between the respective one of the antennas and each of other ones of the antennas.

6. The wireless device of clause 5, wherein the second component for each of the MIMO RF exposure distributions comprises a sum of multiple components, each of the multiple components comprising a square root of a product of the RF exposure distribution for the respective one of the antennas and an RF exposure distribution for a respective one of the other ones of the antennas.

7. The wireless device of clause 5 or 6, further comprising a memory storing the MIMO RF exposure distributions, wherein the processor is configured to retrieve the MIMO RF exposure distributions from the memory.

8. The wireless device of any one of clauses 1 to 7, wherein the processor is configured to:
   determine transmission power levels that result in a peak value of the combined MIMO RF exposure distribution being equal to or less than an exposure limit; and determine the maximum allowable power levels based on the determined transmission power levels.

9. The wireless device of clause 8, wherein each of the MIMO RF exposure distributions is scaled based on a respective one of the transmission power levels.

10. The wireless device of clause 8 or 9, wherein the MIMO RF exposure distributions are normalized with respect to the exposure limit.

11. The wireless device of clause 10, wherein the exposure limit is equal to or less than a regulatory exposure limit.

12. The wireless device of any one of clauses 1 to 7, wherein the combined MIMO RF exposure distribution corresponds to a future time slot, and the processor is configured to:
average the combined MIMO RF exposure distribution with MIMO RF exposure distributions corresponding to previous time slots to obtain a time-averaged RF exposure distribution;
determine transmission power levels for the future time slot that result in a peak value of the time-averaged RF exposure distribution being equal to or less than an exposure limit; and
determine the maximum allowable power levels based on the determined transmission power levels for the future time slot.

13. The wireless device of clause 12, wherein each of the MIMO RF exposure distributions in the combined MIMO RF exposure distribution is scaled based on a respective one of the transmission power levels for the future time slot.

14. The wireless device of clause 13, wherein the MIMO RF exposure distributions are normalized with respect to the exposure limit.

15. The wireless device of clause 14, wherein the exposure limit is equal to or less than a regulatory exposure limit.

16. The wireless device of any one of clauses 1 to 15, wherein the processor is further configured to:
combine non-MIMO RF exposure distributions into a combined non-MIMO RF exposure distribution; and
determine the maximum allowable power levels based on a combination of the combined MIMO RF exposure distribution and the combined non-MIMO RF exposure distribution.

17. The wireless device of clause 16, wherein each of the non-MIMO RF exposure distributions comprises a respective non-MIMO specific absorption rate (SAR) distribution.

18. The wireless device of claim 16, wherein each of the non-MIMO RF exposure distributions comprises a respective non-MIMO power density (PD) distribution.

19. The wireless device of any one of clauses 16 to 18, wherein the MIMO RF exposure distributions correspond to a first subset of the antennas, and the non-MIMO RF exposure distributions correspond to a second subset of the antennas.

20. The wireless device of any one of clauses 16 to 19, wherein at least one of the MIMO RF exposure distributions and at least one of the non-MIMO RF exposure distributions correspond to a same one of the antennas.

21. The wireless device of clause 20, wherein the at least one of the MIMO RF exposure distributions corresponds to a first transmitting frequency and the at least one of the non-MIMO RF exposure distributions corresponds to a second transmitting frequency.

22. The wireless device of any one of clauses 16 to 21, wherein the processor is configured to:
determine transmission power levels that result in a peak value of the combination of the combined MIMO RF exposure distribution and the combined non-MIMO RF exposure distribution being equal to or less than an exposure limit; and
determine the maximum allowable power levels based on the determined transmission power levels.

23. The wireless device of any one of clauses 1 to 22, wherein a first one of the MIMO RF exposure distributions and a second one of the MIMO RF exposure distributions correspond to a same one of the antennas.

24. The wireless device of clause 23, wherein the first one of the MIMO RF exposure distributions corresponds to a first transmitting frequency and the second one of the MIMO RF exposure distributions corresponds to a second transmitting frequency.

25. A method for operating a wireless device comprising multiple transmit circuits, wherein the transmit circuits are configured to transmit multiple radio frequency (RF) signals via multiple antennas, the method comprising:
combining multiple-input-multiple-output (MIMO) radio frequency (RF) exposure distributions into a combined MIMO RF exposure distribution, wherein the combined MIMO RF exposure distribution comprises a linear combination of the MIMO RF exposure distributions;
determining maximum allowable power levels based on the combined MIMO RF exposure distribution, wherein each of the maximum allowable power levels corresponds to a respective one of the transmit circuits; and
for each of the transmit circuits, setting a respective power level limit based on the respective one of the maximum allowable power levels.

26. The method of clause 25, wherein each of the MIMO RF exposure distributions comprises a respective MIMO specific absorption rate (SAR) distribution.

27. The method of clause 25, wherein each of the MIMO RF exposure distributions comprises a respective MIMO power density (PD) distribution.

28. The method of any one of clauses 25 to 27, wherein the transmit circuits are configured to transmit the RF signals at a same transmitting frequency.

29. The method of any one of clauses 25 to 28, wherein each of the MIMO RF exposure distributions comprises a first component and a second component, the first component comprising a RF exposure distribution for a respective one of the antennas, and the second component accounting for a correlation between the respective one of the antennas and each of other ones of the antennas.

30. The method of clause 29, wherein the second component for each of the MIMO RF exposure distributions comprises a sum of multiple components, each of the multiple components comprising a square root of a product of the RF exposure distribution for the respective one of the antennas and a RF exposure distribution for a respective one of the other ones of the antennas.

31. The method of any one of clauses 25 to 30, wherein determining the maximum allowable power levels comprises:
determining transmission power levels that result in a peak value of the combined MIMO RF exposure distribution being equal to or less than an exposure limit; and
determining the maximum allowable power levels based on the determined transmission power levels.

32. The method of clause 31, wherein each of the MIMO RF exposure distributions in the combined MIMO RF exposure distribution is scaled based on a respective one of the transmission power levels.

33. The method of clause 32, wherein the MIMO RF exposure distributions are normalized with respect to the exposure limit.

34. The method of clause 33, wherein the exposure limit is equal to or less than a regulatory exposure limit.

35. The method of any one of clauses 25 to 30, wherein the combined MIMO RF exposure distribution corresponds to a future time slot, and determining the maximum allowable power levels comprises:
 averaging the combined MIMO RF exposure distribution with MIMO RF exposure distributions corresponding to previous time slots to obtain a time-averaged RF exposure distribution;
 determining transmission power levels for the future time slot that result in a peak value of the time-averaged RF exposure distribution being equal to or less than an exposure limit; and
 determining the maximum allowable power levels based on the determined transmission power levels for the future time slot.

36. The method of clause 35, wherein each of the MIMO RF exposure distributions in the combined MIMO RF exposure distribution is scaled based on a respective one of the transmission power levels for the future time slot.

37. The method of clause 36, wherein the MIMO RF exposure distributions are normalized with respect to the exposure limit.

38. The method of clause 37, wherein the exposure limit is equal to or less than a regulatory exposure limit.

39. The method of any one of clauses 25 to 38, further comprising:
 combining non-MIMO RF exposure distributions into a combined non-MIMO RF exposure distribution;
 wherein determining the maximum allowable power levels comprises determining the maximum allowable power levels based on a combination of the combined MIMO RF exposure distribution and the combined non-MIMO RF exposure distribution.

40. The method of clause 39, wherein each of the non-MIMO RF exposure distributions comprises a respective non-MIMO specific absorption rate (SAR) distribution.

41. The method of clause 39, wherein each of the non-MIMO RF exposure distributions comprises a respective non-MIMO power density (PD) distribution.

42. The method of any one of clauses 39 to 41, wherein the MIMO RF exposure distributions correspond to a first subset of the antennas, and the non-MIMO RF exposure distributions correspond to a second subset of the antennas.

43. The method of clause 42, wherein at least one of the MIMO RF exposure distributions and at least one of the non-MIMO RF exposure distributions correspond to a same one of the antennas.

44. The method of clause 43, wherein the at least one of the MIMO RF exposure distributions corresponds to a first transmitting frequency and the at least one of the non-MIMO RF exposure distributions corresponds to a second transmitting frequency.

45. The method of any one of clauses 39 to 44, wherein further comprising:
 determining transmission power levels that result in a peak value of the combination of the combined MIMO RF exposure distribution and the combined non-MIMO RF exposure distribution being equal to or less than an exposure limit;
 wherein determining the maximum allowable power levels comprises determining the maximum allowable power levels based on the determined transmission power levels.

46. The method of any one of clauses 25 to 45, wherein a first one of the MIMO RF exposure distributions and a second one of the MIMO RF exposure distributions correspond to a same one of the antennas.

47. The method of clause 46, wherein the first one of the MIMO RF exposure distributions corresponds to a first transmitting frequency and the second one of the MIMO RF exposure distributions corresponds to a second transmitting frequency.

48. A computer readable medium comprising instructions stored thereon for:
 combining multiple-input-multiple-output (MIMO) radio frequency (RF) exposure distributions into a combined MIMO RF exposure distribution, wherein the combined MIMO RF exposure distribution comprises a linear combination of the MIMO RF exposure distributions;
 determining maximum allowable power levels based on the combined MIMO RF exposure distribution, wherein each of the maximum allowable power levels corresponds to a respective one of multiple transmit circuits; and
 for each of the transmit circuits, setting a respective power level limit based on the respective one of the maximum allowable power levels.

It is to be appreciated that the present disclosure is not limited to the exemplary terms used above to describe aspects of the present disclosure, and that the present disclosure covers equivalent terms. For example, it is to be appreciated that an antenna may also be referred to as an antenna element or another term. In yet another example it is to be appreciated that a maximum allowable power level may also be referred to as a power level limit or another term.

The term "approximately", as used herein with respect to a stated value or a property, is intended to indicate being within 10% of the stated value or property.

Any reference to an element herein using a designation such as "first," "second," and so forth does not generally limit the quantity or order of those elements. Rather, these designations are used herein as a convenient way of distinguishing between two or more elements or instances of an element. Thus, a reference to first and second elements does not mean that only two elements can be employed, or that the first element must precede the second element.

Within the present disclosure, the word "exemplary" is used to mean "serving as an example, instance, or illustration." Any implementation or aspect described herein as "exemplary" is not necessarily to be construed as preferred or advantageous over other aspects of the disclosure. Likewise, the term "aspects" does not require that all aspects of the disclosure include the discussed feature, advantage or mode of operation.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples described herein but is to be accorded the widest scope consistent with the principles and novel features disclosed herein.

What is claimed is:

1. A wireless device, comprising:
multiple transmit circuits, wherein the multiple transmit circuits are configured to transmit multiple radio frequency (RF) signals via multiple antennas; and
a processor coupled to the transmit circuits, wherein the processor is configured to:
combine multiple-input-multiple-output (MIMO) radio frequency (RF) exposure distributions into a combined MIMO RF exposure distribution, wherein the combined MIMO RF exposure distribution comprises a linear combination of the MIMO RF exposure distributions;
determine maximum allowable power levels based on the combined MIMO RF exposure distribution, wherein each of the maximum allowable power levels corresponds to a respective one of the transmit circuits; and
for each of the transmit circuits, set a respective power level limit based on the respective one of the maximum allowable power levels.

2. The wireless device of claim 1, wherein each of the MIMO RF exposure distributions comprises a respective MIMO specific absorption rate (SAR) distribution.

3. The wireless device of claim 1, wherein each of the MIMO RF exposure distributions comprises a respective MIMO power density (PD) distribution.

4. The wireless device of claim 1, wherein the transmit circuits are configured to transmit the RF signals at a same transmitting frequency.

5. The wireless device of claim 1, wherein each of the MIMO RF exposure distributions comprises a first component and a second component, the first component comprising an RF exposure distribution for a respective one of the antennas, and the second component accounting for a correlation between the respective one of the antennas and each of other ones of the antennas.

6. The wireless device of claim 5, wherein the second component for each of the MIMO RF exposure distributions comprises a sum of multiple components, each of the multiple components comprising a square root of a product of the RF exposure distribution for the respective one of the antennas and an RF exposure distribution for a respective one of the other ones of the antennas.

7. The wireless device of claim 5, further comprising a memory storing the MIMO RF exposure distributions, wherein the processor is configured to retrieve the MIMO RF exposure distributions from the memory.

8. The wireless device of claim 1, wherein the processor is configured to:
determine transmission power levels that result in a peak value of the combined MIMO RF exposure distribution being equal to or less than an exposure limit; and
determine the maximum allowable power levels based on the determined transmission power levels.

9. The wireless device of claim 8, wherein each of the MIMO RF exposure distributions is scaled based on a respective one of the transmission power levels.

10. The wireless device of claim 1, wherein the combined MIMO RF exposure distribution corresponds to a future time slot, and the processor is configured to:
average the combined MIMO RF exposure distribution with MIMO RF exposure distributions corresponding to previous time slots to obtain a time-averaged RF exposure distribution;
determine transmission power levels for the future time slot that result in a peak value of the time-averaged RF exposure distribution being equal to or less than an exposure limit; and
determine the maximum allowable power levels based on the determined transmission power levels for the future time slot.

11. The wireless device of claim 10, wherein each of the MIMO RF exposure distributions in the combined MIMO RF exposure distribution is scaled based on a respective one of the transmission power levels for the future time slot.

12. The wireless device of claim 1, wherein the processor is further configured to:
combine non-MIMO RF exposure distributions into a combined non-MIMO RF exposure distribution; and
determine the maximum allowable power levels based on a combination of the combined MIMO RF exposure distribution and the combined non-MIMO RF exposure distribution.

13. The wireless device of claim 12, wherein the MIMO RF exposure distributions correspond to a first subset of the antennas, and the non-MIMO RF exposure distributions correspond to a second subset of the antennas.

14. The wireless device of claim 12, wherein at least one of the MIMO RF exposure distributions and at least one of the non-MIMO RF exposure distributions correspond to a same one of the antennas.

15. The wireless device of claim 14, wherein the at least one of the MIMO RF exposure distributions corresponds to a first transmitting frequency and the at least one of the non-MIMO RF exposure distributions corresponds to a second transmitting frequency.

16. A method for operating a wireless device comprising multiple transmit circuits, wherein the transmit circuits are configured to transmit multiple radio frequency (RF) signals via multiple antennas, the method comprising:
combining multiple-input-multiple-output (MIMO) radio frequency (RF) exposure distributions into a combined MIMO RF exposure distribution, wherein the combined MIMO RF exposure distribution comprises a linear combination of the MIMO RF exposure distributions;
determining maximum allowable power levels based on the combined MIMO RF exposure distribution, wherein each of the maximum allowable power levels corresponds to a respective one of the transmit circuits; and
for each of the transmit circuits, setting a respective power level limit based on the respective one of the maximum allowable power levels.

17. The method of claim 16, wherein each of the MIMO RF exposure distributions comprises a respective MIMO specific absorption rate (SAR) distribution.

18. The method of claim 16, wherein each of the MIMO RF exposure distributions comprises a respective MIMO power density (PD) distribution.

19. The method of claim 16, wherein the transmit circuits are configured to transmit the RF signals at a same transmitting frequency.

20. The method of claim 16, wherein each of the MIMO RF exposure distributions comprises a first component and a second component, the first component comprising a RF exposure distribution for a respective one of the antennas, and the second component accounting for a correlation between the respective one of the antennas and each of other ones of the antennas.

21. The method of claim 20, wherein the second component for each of the MIMO RF exposure distributions comprises a sum of multiple components, each of the multiple components comprising a square root of a product of the RF exposure distribution for the respective one of the antennas and a RF exposure distribution for a respective one of the other ones of the antennas.

22. The method of claim 16, wherein determining the maximum allowable power levels comprises:
   determining transmission power levels that result in a peak value of the combined MIMO RF exposure distribution being equal to or less than an exposure limit; and
   determining the maximum allowable power levels based on the determined transmission power levels.

23. The method of claim 22, wherein each of the MIMO RF exposure distributions in the combined MIMO RF exposure distribution is scaled based on a respective one of the transmission power levels.

24. The method of claim 16, wherein the combined MIMO RF exposure distribution corresponds to a future time slot, and determining the maximum allowable power levels comprises:
   averaging the combined MIMO RF exposure distribution with MIMO RF exposure distributions corresponding to previous time slots to obtain a time-averaged RF exposure distribution;
   determining transmission power levels for the future time slot that result in a peak value of the time-averaged RF exposure distribution being equal to or less than an exposure limit; and
   determining the maximum allowable power levels based on the determined transmission power levels for the future time slot.

25. The method of claim 24, wherein each of the MIMO RF exposure distributions in the combined MIMO RF exposure distribution is scaled based on a respective one of the transmission power levels for the future time slot.

26. The method of claim 16, further comprising:
   combining non-MIMO RF exposure distributions into a combined non-MIMO RF exposure distribution;
   wherein determining the maximum allowable power levels comprises determining the maximum allowable power levels based on a combination of the combined MIMO RF exposure distribution and the combined non-MIMO RF exposure distribution.

27. The method of claim 26, wherein the MIMO RF exposure distributions correspond to a first subset of the antennas, and the non-MIMO RF exposure distributions correspond to a second subset of the antennas.

28. The method of claim 26, wherein at least one of the MIMO RF exposure distributions and at least one of the non-MIMO RF exposure distributions correspond to a same one of the antennas.

29. The method of claim 28, wherein the at least one of the MIMO RF exposure distributions corresponds to a first transmitting frequency and the at least one of the non-MIMO RF exposure distributions corresponds to a second transmitting frequency.

30. A tangible non-transitory computer readable medium comprising instructions stored thereon for:
   combining multiple-input-multiple-output (MIMO) radio frequency (RF) exposure distributions into a combined MIMO RF exposure distribution, wherein the combined MIMO RF exposure distribution comprises a linear combination of the MIMO RF exposure distributions;
   determining maximum allowable power levels based on the combined MIMO RF exposure distribution, wherein each of the maximum allowable power levels corresponds to a respective one of multiple transmit circuits; and
   for each of the transmit circuits, setting a respective power level limit based on the respective one of the maximum allowable power levels.

* * * * *